(12) United States Patent
Takada et al.

(10) Patent No.: US 7,678,455 B2
(45) Date of Patent: Mar. 16, 2010

(54) LAYERED FILM AND PROCESS FOR PRODUCING LAYERED FILM

(75) Inventors: Yasushi Takada, Otsu (JP); Yuri Kubota, Otsu (JP); Takashi Mumura, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/497,555

(22) PCT Filed: Dec. 4, 2002

(86) PCT No.: PCT/JP02/12700

§ 371 (c)(1),
(2), (4) Date: Jul. 12, 2004

(87) PCT Pub. No.: WO03/047853

PCT Pub. Date: Jun. 12, 2003

(65) Prior Publication Data

US 2005/0064198 A1    Mar. 24, 2005

(30) Foreign Application Priority Data

Dec. 6, 2001    (JP) .............................. 2001-372681

(51) Int. Cl.
*B32B 9/04* (2006.01)

(52) U.S. Cl. ...................................... 428/413; 428/419

(58) Field of Classification Search .............. 428/292.1, 428/411.1, 413, 419; 525/186
See application file for complete search history.

(56) References Cited

U.S. PATENT DOCUMENTS

| 5,276,102 | A | | 1/1994 | Rossi et al. | |
|---|---|---|---|---|---|
| 5,300,575 | A | * | 4/1994 | Jonas et al. | .................. 525/186 |
| 5,328,961 | A | | 7/1994 | Rossi et al. | |
| 5,993,694 | A | * | 11/1999 | Ito et al. | ..................... 252/500 |
| 6,025,119 | A | * | 2/2000 | Majumdar et al. | .......... 430/529 |

FOREIGN PATENT DOCUMENTS

JP    8-211555 A    8/1996

* cited by examiner

*Primary Examiner*—Thao T. Tran
(74) *Attorney, Agent, or Firm*—DLA Piper LLP (US)

(57) ABSTRACT

A laminated film is provided, in which a laminated layer including at least 50 percent by weight of composition (A) and cross-linking agent (B) is laminated on at least one surface of a thermoplastic resin film, wherein the composition (A) is a composition comprising a polythiophene and a polyanion or a composition comprising a polythiophene derivative and a polyanion, and the laminated layer has a sea-island structure in which the cross-linking agent (B) is present in the composition (A). Consequently, a laminated film exhibits an unprecedentedly high level of antistatic property unaffected by changes in humidity, and has excellent transparency, water resistance, and scratch resistance.

27 Claims, 2 Drawing Sheets

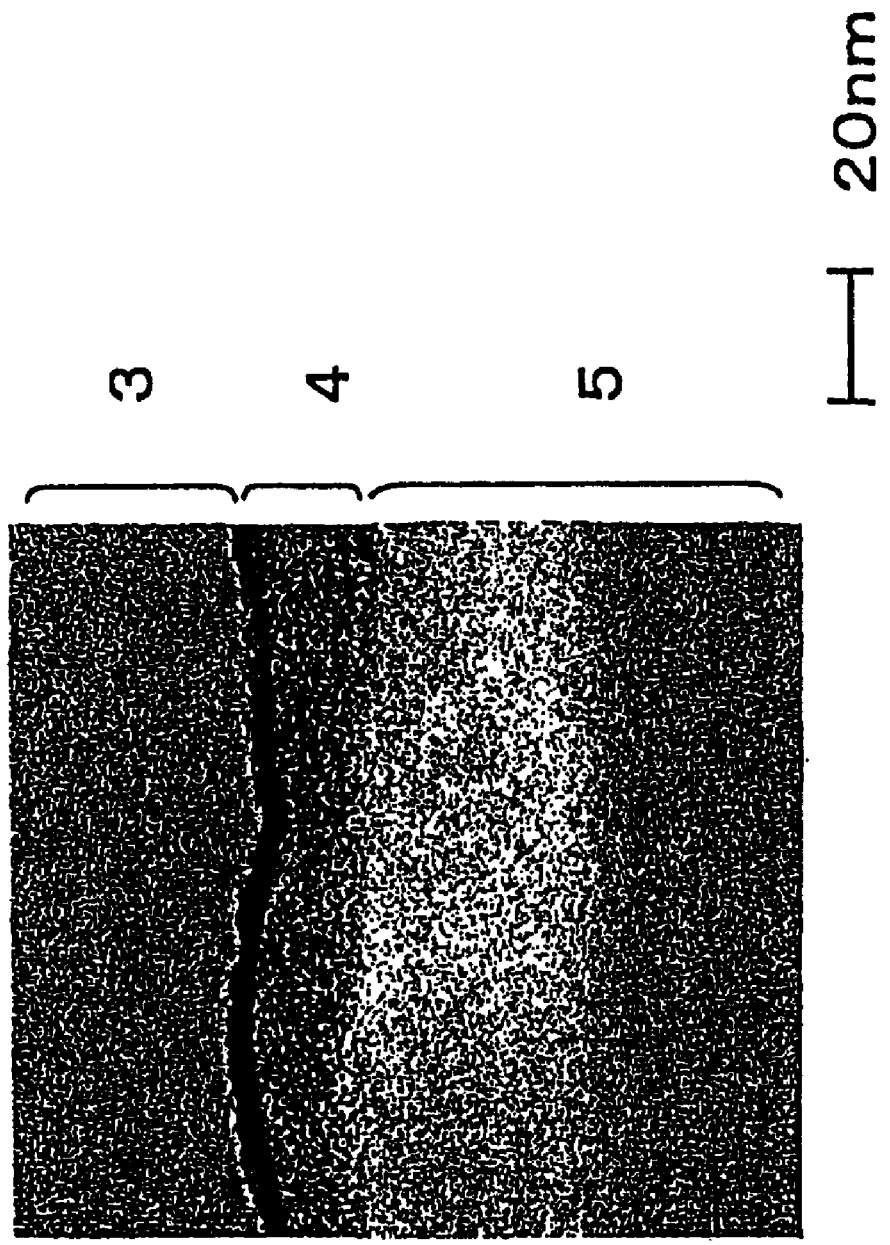

LAYERED FILM AND PROCESS FOR PRODUCING LAYERED FILM

TECHNICAL FIELD

This disclosure relates to a laminated film. In particular, it relates to a laminated film which exhibits a high level of antistatic property unaffected by changes in humidity and which has excellent transparency, water resistance, and scratch resistance.

BACKGROUND ART

Thermoplastic resin films, e.g., polyolefin films, polyester films, polyamide films, and polyphenylene sulfide films, are widely used as base films for various purposes, e.g., industrial material uses, magnetic material uses, and packaging uses, because of light weights, small thicknesses, and excellent mechanical properties. Furthermore, in accordance with the trend toward lighter weight, smaller thickness, and further miniaturization, demand for the film is expected to grow in various areas.

Most of all, biaxially oriented polyester films have excellent properties with respect to the dimensional stability, mechanical properties, thermal resistance, electrical properties, and the like, and therefore, are widely used as base films for many purposes, for example, magnetic materials, e.g., magnetic tapes typified by VHS tapes, audiotapes, and backup tapes of computer data and cards, such as prepaid cards, IC cards, and optical recording cards; packaging materials; electrically insulating materials; various photographic materials; graphic arts materials; and label materials.

However, since the polyester is an insulating resin, in general, there is a problem in that biaxially oriented polyester films have no antistatic property unless being further treated. As a result, dust tends to settle on the biaxially oriented polyester film if no treatment is performed, and products composed of the biaxially oriented polyester film tend to become into intimate contact with each other due to electrification, so that ease of handling is deteriorated. Furthermore, electrostatic problems occur in that, for example, an electric shock and explosion occur due to electrostatic discharge, and precision electronic circuit material elements and the like are broken due to electrostatic discharge.

Consequently, researches have been previously conducted in order to impart the antistatic property to polyester films by various methods.

Examples of known methods for preventing electrification include incorporation of an antistatic agent into a base film and impartation of an antistatic property to a base film surface. For example, methods in which a polyester resin is mixed with an antistatic agent and is applied, as described in Japanese Unexamined Patent Application Publication No. 60-141525 and the like, and methods in which a styrene sulfonic acid copolymer is applied, as described in Japanese Unexamined Patent Application Publication No. 61-204240 and the like, are methods for preventing electrification through the use of ionic conduction type antistatic agents. In these methods, an electrical conduction mechanism depending on adsorption of water in air due to ions is used and, therefore, these methods have dependence on humidity. In particular, the humidity dependence is significant when a low-molecular weight type antistatic agent is used and, therefore, with respect to the product quality, serious problems occur in that, for example, no antistatic property is attained under an environment in which the humidity is low as in winter and the like.

In methods described in Japanese Unexamined Patent Application Publication No. 7-101016, Japanese Unexamined Patent Application Publication No. 7-330901, and the like, a layer of a polyaniline-based conductive agent is provided on a surface of a polyester film, and the polyaniline-based conductive agent to be used is an electron conduction type antistatic agent. The conduction mechanism thereof is based on conjugated electrons and, therefore, has no dependence on humidity. However, the polyaniline-based conductive agent is green in the condition of being subjected to doping, and there are problems in that, for example, an outward appearance of a product is not preferable, and uses are restricted.

In methods described in Japanese Unexamined Patent Application Publication No. 9-152723, Japanese Unexamined Patent Application Publication No. 11-278582, Japanese Unexamined Patent Application Publication No. 7-329250, and the like, a layer of tin oxide-based conductive agent doped with antimony is provided on a polyester film surface. These are methods for preventing electrification through the use of an electron conduction type antistatic agent. The conduction mechanism thereof is based on conjugated electrons and, therefore, has no dependence on humidity. However, in order to exhibit the conductivity, the tin oxide-based antistatic agent is in need of a doping agent containing a hazardous heavy metal, e.g., antimony. Furthermore, when a granular antistatic agent typified by the tin oxide-based antistatic agent is applied to an in-line coating method in which coating, stretching, and a heat treatment are performed during a film formation step, no follow-up property to stretching is exhibited and, therefore, problems occur in that, for example, cracks occur in the coating film due to stretching, the coating film is whitened or the coating film becomes brittle, and no scratch resistance is exhibited.

In methods for preventing electrification through the use of other electron conduction type antistatic agents described in Japanese Unexamined Patent Application Publication No. 1-313521, Japanese Unexamined Patent Application Publication No. 6-295016, and the like, impartation of the antistatic property by a polythiophene-based conductive agent is proposed. However, an adequate antistatic property is not attained by, for example, a method for preventing electrification in which a coating solution containing the polythiophene-based conductive agent and a latex polymer is applied. In order to exhibit a high level of antistatic property, large amounts of polythiophene-based conductive agent must be added. Consequently, when this method is applied to the in-line coating method, there are problems in that the coating film has significantly poor transparency, and the coating film is whitened, in a manner similar to that in other electron conduction type antistatic agents. Therefore, this method is not worthy of practical use.

Protective films will be described below.

In recent years, the changeover from so-called cathode-ray tube televisions to liquid crystal displays have been actively pursued in accordance with a revolution in displays. In particular, with respect to the liquid crystal display, there are steps of processing and mounting of optical sheets, e.g., polarizers, serving as primary constituents, and a protective film is used in order to protect a surface. An adhesive and the like is applied to or laminated on a transparent film, e.g., a polyethylene film, a polypropylene film, or a polyester film, which is used for protection, in order to bond the film together with an optical sheet, e.g., a polarizer. The resulting film is used as the protective film.

After mounting of a liquid crystal display and the like is completed, the protective film is peeled and removed. When the protective film is peeled, a so-called peeling electrification phenomenon occurs, and there is a problem of adhesion of dirt due to static electricity. If dirt is adhered due to static electricity, for example, it is difficult to discriminate between defects of a liquid crystal component itself and defects due to dirt adhered to the surface with respect to the inspection of products, and the inspection is not conducted smoothly. As a result, significant problems occur in the manufacturing process. In particular, with respect to recent high-precision display and the like, besides the problem of the adhesion of dirt due to static electricity, a problem of breakage of electronic elements of a display occurs due to peeling electrification.

On the other hand, a protective film prepared by incorporating an antistatic agent to a polyethylene film or a polypropylene film has low transparency. Since the transparency of the protective film is poor, there are problems in that, for example, the inspection accuracy is deteriorated in the inspection of defects of products after a liquid crystal display and the like are mounted, and the inspection takes much time.

With respect to even a protective film made of a polyester film having excellent transparency, a non-treated film has no antistatic property and, therefore, many troubles, e.g., adhesion of dirt, occur due to electrification. In order to overcome this, researches have been conducted on a polyester film incorporating an antistatic agent and a polyester film coated with an antistatic agent. However, any satisfactory film has not been achieved.

Furthermore, cover tapes and carrier packages will be described.

In recent years, surface-mounting chip-shaped electronic components, e.g., ICs (integrated circuits), transistors, diodes, and capacitors, are packaged with a carrier package composed of a carrier tape successively provided with pockets or the like adjusted to the shape of the electronic components by embossing in order to store them and a cover tape sealing the carrier tape through heat seal or an adhesive, the carrier package is taken up into the shape of a reel, and is supplied.

When the surface-mounting chip-shaped electronic components are used in practice, they are carried, while being in the state of the reel, to a manufacturing step in which the surface-mounting chip-shaped electronic components are used, and products are manufactured continuously on a production line while the cover tape is peeled off the carrier package, in which the carrier tape is sealed with the cover tape, and the electronic components are taken out.

When the cover tape is peeled off, problems occur in that the electronic components are accidentally released and the electronic components are scattered or that discharge occurs between an electrified tape and an electronic component and the electronic component is electrically broken.

Beside the peeling electrification, in a step of storing an electronic component in a carrier tape, followed by sealing, it is known that a phenomenon of frictional electrification occurs due to friction between the electronic component and a carrier roll, a heating bar used for heat seal, and the like. Since the surface-mounting chip-shaped electronic component is a small electronic component, for example, in the case where the winding is performed into the shape of a reel having a very small width on the order of 5 mm and a length on the order of several thousand meters, if the frictional electrification phenomenon occurs, problems come up, wherein straying occurs and, thereby, the winding into the shape of a reel cannot be smoothly performed, or an electronic component in a stored state is electrically broken, in a manner similar to that in the above-described peeling electrification.

In general, when packaging into the carrier package is completed, inspections of the electronic components are performed from the cover tape side, wherein the inspection items includes mixing of different types, bending of lead terminals, error in packing direction of IC chips, and the like. In order to readily perform these inspections, the cover tape is strongly required to have transparency. For example, a transparent polyester film, a transparent polyolefin film, and the like, each having high transparency, have been used directly.

Under the above-described circumstances, research is conducted on impartation of the antistatic property to the carrier tape side in order to overcome the electrification problem.

In many cases, various resins, e.g., polystyrene, are used as carrier tapes. In order to reduce electrification of the carrier tape itself, for example, carbon or the like serving as an antistatic agent is incorporated, or paper or the like is used as an antistatic agent with respect to inexpensive types. However, any carrier tape having satisfactory performance has not been attained until now.

SUMMARY

A laminated film is a laminated film in which a laminated layer comprising at least 50 percent by weight of composition (A) and cross-linking agent (B) is laminated on at least one surface of a thermoplastic resin film, wherein the composition (A) is a composition comprising a polythiophene and a polyanion or a composition comprising a polythiophene derivative and a polyanion, and the laminated layer has a sea-island structure in which the cross-linking agent (B) is present in the composition (A).

A method for manufacturing a laminated film comprises the steps of applying a coating solution containing a composition (A) and a cross-linking agent (B) to at least one surface of a thermoplastic resin film, and performing drying, stretching and, thereafter, heat-treating, wherein the composition (A) is a composition comprising a polythiophene and a polyanion or a composition comprising a polythiophene derivative and a polyanion, and 10 to 85 percent by weight of cross-linking agent (B) is contained in the coating solution.

A laminated film for a protective film is manufactured by a method comprising the steps of applying a coating solution containing a composition (A) and a cross-linking agent (B) to at least one surface of a thermoplastic resin film, and performing drying, stretching and, thereafter, heat-treating, wherein the composition (A) is a composition comprising a polythiophene and a polyanion or a composition comprising a polythiophene derivative and a polyanion, and 25 to 85 percent by weight of cross-linking agent (B) is contained in the coating solution.

A laminated film for a cover tape is manufactured by a method comprising the steps of applying a coating solution containing a composition (A) and a cross-linking agent (B) to at least one surface of a thermoplastic resin film, and performing drying, stretching and, thereafter, heat-treating, wherein the composition (A) is a composition comprising a polythiophene and a polyanion or a composition comprising a polythiophene derivative and a polyanion, and 10 to 85 percent by weight of cross-linking agent (B) is contained in the coating solution.

BRIEF DESCRIPTION OF THE DRAWINGS

FIG. 2 is a transmission electron micrograph (magnification: 500,000 times) of a cross-section of a typical laminated layer of a laminated film.

REFERENCE NUMERALS

Figure 1:
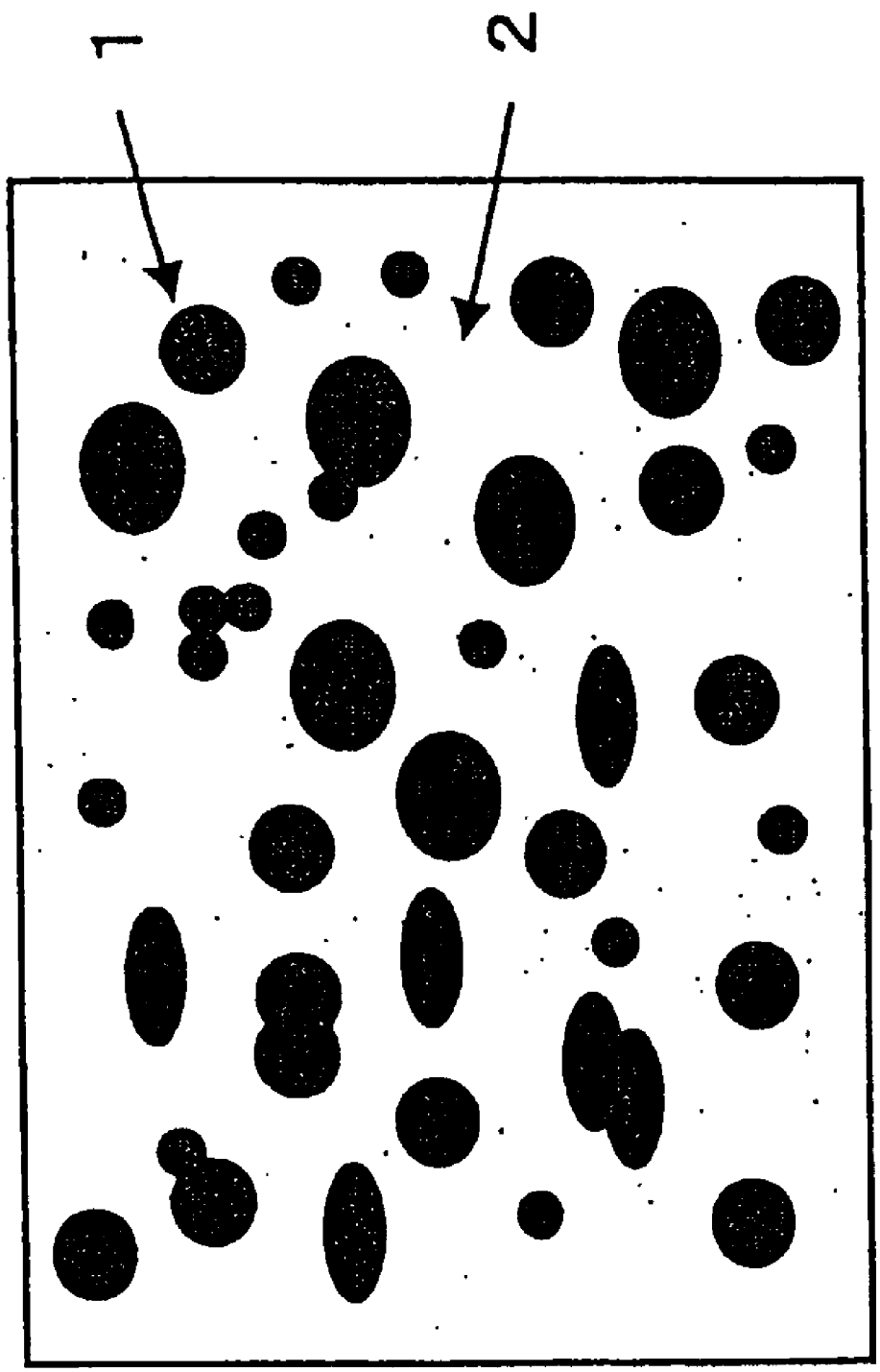
FIG. 1 is a typical schematic diagram of a "sea-island structure" of a laminated film.

1: "island" portion
2: "sea" portion
3: embedding resin layer
4: laminated layer
5: PET film

DETAILED DESCRIPTION

In a laminated film, a laminated layer comprising at least 50 percent by weight of composition (A) and cross-linking agent (B) is laminated, wherein the composition (A) is a composition comprising a polythiophene and a polyanion or a composition comprising a polythiophene derivative and a polyanion, and the laminated layer has a sea-island structure in which the cross-linking agent (B) is present in the composition (A).

The sea-island structure of the laminated film will be described.

The sea-island structure is identified by a transmission electron microscope (hereafter abbreviated as "TEM") observation image of a cross section of a laminated layer. With respect to a mixed phase including at least two components, the sea-island structure is composed of a "sea" portion made of a component forming a continuous phase and "island" portions made of the other components present in the shape of islands in the continuous phase. FIG. 1 is a typical schematic diagram showing a "sea-island structure" of a laminated film. In the drawing, black portions indicate "island" portions, and a continuous white portion other than them correspond to a "sea" portion. In particular, the "island" portions may have various sizes of cross-sectional areas, as shown in the drawing. The shapes of the "island" portions may have various cross-sectional shapes, e.g., a circle, an ellipse, and irregular shapes, and are not specifically limited. A portion having the shape in which at least two island portions are joined is also included in "island" portions.

A TEM observation image of a cross-section of a typical laminated layer of a laminated film is shown in FIG. 2. However, the laminated film is not limited to them.

FIG. 2 is a TEM observation image under a magnification of 500,000 times. A straight line at the lower right of the drawing indicates a scale, and the length shown at the lower right, for example, the length of the straight line in FIG. 2, corresponds to 20 nm.

The forms of "island" portions of the laminated film are not limited, and are, for example, circular, substantially circular, elliptical, and in the form in which at least two circular protrusions are joined.

The laminated layer of the laminated film is a laminated layer containing at least 50 percent by weight of composition (A) and cross-linking agent (B), wherein the composition (A) is a composition composed of a polythiophene and a polyanion or a composition composed of a polythiophene derivative and a polyanion. That is, the content of the total of the composition (A) and the cross-linking agent (B) in the laminated layer must be at least 50 percent by weight of the entire laminated layer. Preferably, the total content of the composition (A) and the cross-linking agent (B) in the laminated film is at least 70 percent by weight, and more preferably is at least 80 percent by weight.

Preferably, the composition (A) in the laminated layer of the laminated film contains a polythiophene and a polythiophene derivative.

The composition (A) usable for the laminated layer of the laminated film may be prepared by polymerizing compounds represented by the following formula 1

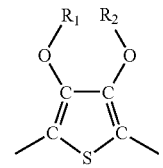

and/or the following formula 2

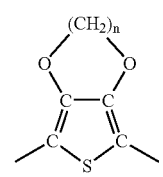

in the presence of polyanions.

In the formula 1, $R_1$ and $R_2$ independently represent a hydrogen atom; or an aliphatic hydrocarbon group, an alicyclic hydrocarbon group, or an aromatic hydrocarbon group, each having the carbon number of 1 to 12. Examples thereof include a methyl group, an ethyl group, a propyl group, an isopropyl group, a butyl group, a cyclohexylene group, and a benzene group. In the formula 2, n represents an integer of 1 to 4.

In the laminated film, preferably, a polythiophene and/or a polythiophene derivative having a structural formula represented by the formula 2 is used. For example, a preferable compound is represented by the formula 2, where n=1 (a methylene group), n =2 (an ethylene group), or n=3 (a propylene group). Among them, a compound including an ethylene group in which n=2, that is, poly-3,4-ethylenedioxythiophene, is particularly preferable.

With respect to the laminated film, examples of the polythiophene and/or the polythiophene derivative include compounds having a structure in which substituents are bonded at positions 3 and 4 of a thiophene ring and, furthermore, a compound in which oxygen atoms are bonded to carbon atoms at positions 3 and 4 as described above. With respect to compounds in which hydrogen atoms or carbon atoms are directly bonded to the above-described carbon atoms, coating solutions may not readily become water-based.

The polyanion in the composition (A) used for the laminated layer of the laminated film will be described.

The polyanion in the laminated film is an acid polymer in a state of a free acid, and is polymeric carboxylic acid, a polymeric sulfonic acid, a polyvinylsulfonic acid, or the like. Examples of polymeric carboxylic acids include a polyacrylic acid, a polymethacrylic acid, and a polymaleic acid. Examples of polymeric sulfonic acids include a polystyrenesulfonic acid. In particular, the polystyrenesulfonic acid is most preferable from the viewpoint of electrical conductivity. A part of free acids may be in the form of neutralized salts.

It is believed that when these polyanions are used in the polymerization, inherently water-insoluble polythiophene-based compounds are readily dispersed in water or readily become water-based, and the function as an acid also serves the function as a dopant of the polythiophene-based compound.

The polymeric carboxylic acid and the polymeric sulfonic acid can be used in the form of a copolymer with other copolymerizable monomers, e.g., acrylates, methacrylates, and styrene.

The molecular weights of the polymeric carboxylic acid and the polymeric sulfonic acid used as polyanions are not specifically limited. However, preferably, the weight average molecular weight thereof is 1,000 to 1,000,000, and more preferably is 5,000 to 150,000 from the viewpoint of the stability and the electrical conductivity of the coating solution. Alkali salts and ammonium salts, e.g., lithium salts and sodium salts, may be contained as a part of them at a content within the range in which the features are not hindered. With respect to the neutralized salts as well, it is known that the equilibrium between a polystyrenesulfonic acid functioning as a very strong acid and an ammonium salt shifts to the acid side due to advancement of the equilibrium reaction after neutralization. Consequently, the neutralized salts are believed to act as dopants.

Preferably, the polyanion is allowed to excessively present relative to the polythiophene or the polythiophene derivative on a weight of solid basis from the viewpoint of the electrical conductivity. Preferably, the polyanion is more than 1 part by weight and 5 parts by weight or less relative to 1 part by weight of the polythiophene and/or the polythiophene derivative, and more preferably is more than 1 part by weight and 3 parts by weight or less.

The above-described composition (A) can be produced by methods described in Japanese Unexamined Patent Application Publication No. 6-295016, Japanese Unexamined Patent Application Publication No. 7-292081, Japanese Unexamined Patent Application Publication No. 1-313521, Japanese Unexamined Patent Application Publication No. 2000-6324, European Patent No. 602713, U.S. Pat. No. 5,391,472, and the like, although methods other than them may be adopted.

With respect to the composition (A), for example, 3,4-ethylenedioxythiophene is prepared from an alkali metal salt of 3,4-dihydroxythiophene-2,5-dicarboxyester as a starting material. Thereafter, potassium peroxodisulfate, iron sulfate, and 3,4-ethylenedioxythiophene prepared as described above are introduced into a polystyrenesulfonic acid aqueous solution, and a reaction is effected, so that a composition is prepared, in which a polyanion, e.g., polystyrenesulfonic acid, constitute a complex with a polythiophene, e.g., poly(3,4-ethylenedioxythiophene).

Examples of the cross-linking agent (B) usable for the laminated layer of the laminated film may include melamine-based cross-linking agents, epoxy-based cross-linking agents, aziridine-based cross-linking agents, epoxyamide compounds, titanate-based coupling agents, e.g., titanium chelate, oxazoline-based cross-linking agents, isocyanate-based cross-linking agents, methylolurea or alkylolurea-based, and acrylamide-based.

Preferably, the molecular weight of the cross-linking agent (B) is 1,000 or less. In particular, when the cross-linking agent (B) is soluble in water and has a molecular weight of 1,000 or less, the flexibility and the flowability are exhibited in a stretching step, the follow-up property to stretching after drying of a mixture constituting the laminated layer is enhanced, a whitening phenomenon due to cracks in the coated layer is reduced, and the transparency is imparted. On the other hand, for example, if the molecular weight becomes too large, phenomena of, for example, cracking of the coated layer occurs during stretching after application and drying and, thereby, the transparency tends to be reduced. When the molecular weight is controlled at 800 or less, more preferably at 600 or less, the composition (A) and the cross-linking agent (B) become further compatible with each other and, thereby, the transparency is improved.

Preferably, the cross-linking agent (B) is a water-soluble cross-linking agent because the transparency, antistatic property, and the like are improved.

A water-soluble cross-linking agent refers to a cross-linking agent having a water solubility of at least 80 percent. Here, the "water solubility" refers to a proportion of the cross-linking agent dissolved into water when 10 parts by weight of solid cross-linking agent is put into 90 parts by weight of water at 23° C. That is, the water solubility of 80 percent represents the state in which 80 percent by weight of 10 parts by weight of cross-linking agent is dissolved into 90 parts by weight of water at 23° C., and the remaining 20 parts by weight of cross-linking agent is left as the insoluble residue. The water solubility of 100 percent represents the state in which 10 parts by weight of cross-linking agent used is completely dissolved into 90 parts by weight of water. Preferably, the cross-linking agent (B) has a water solubility of at least 90 percent, and more preferably has a water solubility of 100 percent. When the water solubility is high, not only the coating solution itself is allowed to become water-based, but also the coated layer is allowed to have excellent transparency and an excellent antistatic property.

The melamine-based cross-linking agent is not specifically limited. Examples of usable compounds include melamine, methylolmelamine derivatives prepared by condensing melamine and formaldehyde, completely or partially etherified compounds prepared by reacting methylolmelamine and lower alcohol, and mixtures thereof. In addition, monomers, condensates composed of dimers or other multimers, mixtures thereof, and the like may be used as the melamine-based cross-linking agent. Examples of lower alcohol usable for etherification include methyl alcohol, ethyl alcohol, isopropyl alcohol, n-butanol and isobutanol. Examples of functional groups include imino type methylated melamine, methylol type melamine, methylol type methylated melamine, and complete alkyl type methylated melamine, each has an imino group, a methylol group, or an alkoxymethyl group, e.g., a methoxymethyl group or a butoxymethyl group, in a molecule. Among them, imino type melamine and methylolmelamine are preferable, and methylol type melamine is more preferable. A water-soluble melamine-based cross-linking agent is most preferable and, for example, methylol type melamine may be suitable for use. In order to accelerate heat curing of the melamine-based cross-linking agent, for example, an acid catalyst, e.g., p-toluenesulfonic acid, may be used. More preferably, a coating solution itself to be applied is an acid solution. Since a polyanion, preferably, polystyrenesulfonic acid is used as the cross-linking agent (B), the above-described cross-linking reaction is accelerated.

An epoxy-based cross-linking agent is particularly preferable as the cross-linking agent (B). The epoxy-based cross-linking agent gives extremely excellent transparency and antistatic property and, thereby, the coated layer can has an excellent coating appearance. Among epoxy-based cross-linking agents, water-soluble epoxy cross-linking agents are further suitable.

The epoxy-based cross-linking agents are suitable because they do not cause blocking compared with addition of, for example, a high-boiling point solvent, e.g., glycerin, so that no contamination occur in the inside of a tenter used in a heat treatment step, nor occurs air pollution.

With respect to the laminated film, the type of the epoxy-based cross-linking agent is not specifically limited. Usable agents may be of sorbitol polyglycidyl ether-based, polyglycerol polyglycidyl ether-based, diglycerol polyglycidyl ether-based, polyethylene glycol diglycidyl ether-based, or the like. Examples of suitable agents may include an epoxy compound "DANACOL" (EX-611, EX-614, EX-614B, EX-512, EX-521, EX-421, EX-313, EX-810, EX-830, EX-850, and the like) produced by Nagase ChemteX Corporation, diepoxy and polyepoxy-based compounds (SR-EG, SR-8EG, SR-GLG, and the like) produced by SAKAMOTO YAKUHIN KOGYO CO., LTD., an epoxy cross-linking agent "EPICLON" EM-85-75W or CR-5L produced by DAINIPPON INK AND CHEMICALS, INCORPORATED. Among them, water-soluble agents are preferable.

Preferably, the epoxy-based cross-linking agent has a weight per epoxy equivalent of 100 to 300 WPE from the viewpoint of the reactivity, and more preferably, the weight per epoxy equivalent is 110 to 200 WPE.

Preferably, the coating solution used for manufacturing the laminated film is a water-based coating solution containing water as a primary medium. For the purposes of improvement in application property, improvement in transparency, and the like, the coating solution used for manufacturing the laminated film may contain an appropriate amount of organic solvent to the extent that the effects are not hindered. Examples of suitable solvents include isopropyl alcohol, butyl cellosolve, ethyl cellosolve, acetone, N-methyl-2-pyrrolidone, ethanol, and methanol. Among them, particularly, isopropyl alcohol is preferably used from the viewpoint of improvement in application property. Preferably, the content thereof is 20 percent by weight or less in the coating solution, and more preferably is 10 percent by weight or less. If the coating solution contains large amounts of organic solvent, when the coating solution is applied to a so-called in-line coating method, it is undesirable, because there is a risk of explosion in a tenter used for performing steps of, for example, preheating, drying, stretching, and a heat treatment.

In the state of a laminated layer, the cross-linking agent (B) of the laminated film may be in the state of being bonded to a functional group included in a component constituting the laminated layer, may be in the unreacted state, or may be in the state in which cross-linking structures are partially formed. In the state of the laminated layer, preferably, the cross-linking agent (B) is in the cross-linking state from the viewpoint of the strength of the coated layer, the blocking resistance, the sticky feeling, the water resistance, and the like. The cross-linking may be in the state in which the cross-linking agent is bonded to a functional group contained in another component, or may has a self cross-linking structure of the cross-linking agent itself.

Preferably, a plurality of cross-linking agents are used together. For example, the combined use of the epoxy-based cross-linking agent and the melamine-based cross-linking agent or the combined use of different types of epoxy-based cross-linking agent is preferable because characteristics of both agents are exhibited.

With respect to the laminated layer of the laminated film, for example, the mixing ratio of the composition (A) and the cross-linking agent (B) is not specifically limited, as long as the laminated layer contains at least 50 percent by weight of composition (A) and cross-linking agent (B), wherein the composition (A) is a composition comprising a polythiophene and a polyanion or a composition comprising a polythiophene derivative and a polyanion, and the laminated layer has a sea-island structure in which the cross-linking agent (B) is present in the composition (A). However, preferably, 10 to 85 percent by weight of cross-linking agent (B) is contained in the laminated layer in order that the effects are clearly exhibited. For example, if the cross-linking agent (B) is less than 10 percent by weight, the antistatic property may not be readily exhibited. When the content of the cross-linking agent (B) is extremely low, the level of insulation is similar to that of an untreated polyester film and the like, whitening of the coated layer occurs significantly, and the transparency is poor. On the other hand, if the cross-linking agent (B) exceeds 85 percent by weight, the transparency becomes better, but the antistatic property resists may not be exhibited. According to our research, it is preferable that the content of the cross-linking agent (B) is 25 to 85 percent by weight from the viewpoint of the transparency, more preferably is 25 to 75 percent by weight, and most preferably is 50 to 75 percent by weight. When the content of the cross-linking agent (B) in the laminated layer is controlled at 25 to 75 percent by weight, the transparency and the antistatic property can become mutually compatible at an extremely high level.

Preferably, the laminated layer of the laminated film contains a polyester resin in addition to the composition (A) and the cross-linking agent (B). In the case where a polyester film is used as the thermoplastic resin film, preferably, the polyester resin is contained because the adhesion between a base film and the laminated layer is increased. Other resins, e.g., acrylic resins and urethane resins, may be used.

The polyester resin suitable as a constituent of the laminated layer of the laminated film has an ester bond in a main chain or a side chain, and is produced by polycondensation of dicarboxylic acid and diol.

Examples of carboxylic acid components constituting the polyester resin may include aromatic, aliphatic, and alicyclic dicarboxylic acids and polyvalent carboxylic acids of at least trivalent.

Examples of aromatic dicarboxylic acids may include terephthalic acid, isophthalic acid, orthophthalic acid, phthalic acid, 2,5-dimethyl terephthalic acid, 1,4-naphthalenedicarboxylic acid, biphenyldicarboxylic acid, 2,6-naphthalenedicarboxylic acid, 1,2-bisphenoxyethane-p,p'-dicarboxylic acid, and phenylindandicarboxylic acid. It is preferable to use polyesters in which these aromatic dicarboxylic acids constitute preferably at least 30 mole percent of the entire dicarboxylic acid components, more preferably at least 35 mole percent, and most preferably at least 40 mole percent from the viewpoint of the strength and the heat resistance of the laminated layer.

Examples of aliphatic and alicyclic dicarboxylic acids include succinic acid, adipic acid, sebacic acid, azelaic acid, dodecanedioic acid, dimer acid, 1,3-cyclopentanedicarboxylic acid, 1,2-cyclohexanedicarboxylic acid, 1,4-cyclohexanedicarboxylic acid, and ester-forming derivatives thereof.

Examples of glycol components of the polyester resin may include ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, neopentyl glycol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexane dimethanol, 1,3-cyclohexane dimethanol, 1,4-cyclohexane dimethanol, 2,2,4,4-tetramethyl-1,3-cyclobutanediol, 4,4'-thiodiphenol, bisphenol A, 4,4'-methylenediphenol, 4,4'-(2-norbornylidene)diphenol, 4,4'-dihydroxybiphenyl, o-, m-, and p-dihydroxybenzene, 4,4'-isopropylidenephenol, 4,4'- isopropylidenebindiol, cyclopentane-1,2-diol, cyclohexane-1,2-diol, and cyclohexane-1,4-diol.

In the case where a polyester resin is used as a water-based coating solution, in order to allow the polyester resin to readily become soluble in water or to be readily dispersed in water, preferably, copolymerization with a compound containing a sulfonate group or a compound containing a carboxylate group is performed.

Examples of compounds containing a carboxylate group include trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid, 1,2,3,4-pentanetetracarboxylic acid, 3,3',4,4'-benzophenonetetracarboxylic acid, 5-(2,5-dioxotetrahydrofurfuryl)-3-methyl-3-cyclohexene-1,2-dicarboxylic acid, 5-(2,5-dioxotetrahydrofurfuryl)-3-cyclohexene-1,2-dicarboxylic acid, cyclopentanetetracarboxylic acid, 2,3,6,7-naphthalenetetracarboxylic acid, 1,2,5,6-naphthalenetetracarboxylic acid, ethylene glycol bistrimellitate, 2,2',3,3'-diphenyltetracarboxylic acid, thiophene-2,3,4,5-tetracarboxylic acid, ethylenetetracarboxylic acid, alkali metal salts thereof, alkaline-earth metal salts thereof, and ammonium salts thereof, although not limited to them.

Examples of compounds containing a sulfonate group may include sulfoterephthalic acid, 5-sulfoisophthalic acid, 4-sulfoisophthalic acid, 4-sulfonaphthalene-2,7-dicarboxylic acid, sulfo-p-xylylene glycol, 2-sulfo-1,4-bis(hydroxyethoxy)benzene, alkali metal salts thereof, alkaline-earth metal salts thereof, and ammonium salts thereof, although not limited to them.

Modified polyester copolymers e.g., block copolymers, graft copolymers, and the like modified by acryl, urethane, epoxy, and the like may be used as the polyester resin.

Examples of preferable polyester resins include copolymers of acid components selected from terephthalic acid, isophthalic acid, sebacic acid, and 5-sodium sulfoisophthalic acid and glycol components selected from ethylene glycol, diethylene glycol, 1,4-butanediol, and neopentyl glycol. In the case where the water resistance is required, copolymers in which trimellitic acid is used as a copolymer component in place of 5-sodium sulfoisophthalic acid may also be suitable for use.

With respect to the laminated film, the polyester resin used for the laminated layer may be prepared by the following manufacturing method.

For example, a polyester resin prepared from a dicarboxylic acid component including terephthalic acid, isophthalic acid, and 5-sodium sulfoisophthalic acid and a glycol component including ethylene glycol and neopentyl glycol will be described. The polyester resin can be prepared by, for example, a method in which terephthalic acid, isophthalic acid, and 5-sodium sulfoisophthalic acid are directly subjected to an esterification reaction with ethylene glycol and neopentyl glycol, and a method in which terephthalic acid, isophthalic acid, and 5-sodium sulfoisophthalic acid are subjected to a transesterification reaction with ethylene glycol and neopentyl glycol at a first stage, and the reaction product of this first stage is subjected to a polycondensation reaction at a second stage.

At this time, for example, alkali metals, alkaline-earth metals, manganese, cobalt, zinc, antimony, germanium, and titanium compounds may be used as a reaction catalyst.

Polyester resins including many carboxylic acids at terminals and/or in side chains may be prepared from resins produced by copolymerization through the use of a multivalent carboxylic acid of at least trivalent, as described in Japanese Unexamined Patent Application Publication No. 54-46294, Japanese Unexamined Patent Application Publication No. 60-209073, Japanese Unexamined Patent Application Publication No. 62-240318, Japanese Unexamined Patent Application Publication No. 53-26828, Japanese Unexamined Patent Application Publication No. 53-26829, Japanese Unexamined Patent Application Publication No. 53-98336, Japanese Unexamined Patent Application Publication No. 56-116718, Japanese Unexamined Patent Application Publication No. 61-124684, Japanese Unexamined Patent Application Publication No. 62-240318, and the like. However, methods other than these may be adopted.

The intrinsic viscosity of the polyester resin used for the laminated layer of the laminated film is not specifically limited. However, preferably, the intrinsic viscosity is at least 0.3 dl/g, more preferably is at least 0.35 dl/g, and most preferably is at least 0.4 dl/g.

Preferably, the glass transition point (hereafter abbreviated as "Tg") of the polyester resin is 0° C. to 130° C., and more preferably is 10° C. to 85° C. If the Tg is lower than 0° C., for example, a blocking phenomenon may occurs, in which laminated layers are mutually adhered. If the Tg exceeds 130° C., it is undesirable, because the stability and the dispersibility in water of the resin may become poor.

The above-described polyester resins and other resins may be used alone, or two different types of resin, for example, a polyester resin and an urethane resin, a polyester resin and an acrylic resin, or an urethane resin and an acrylic resin, may be used in combination. As a matter of course, at least three types may be used in combination. Preferably, a mixture of resins is used because in many cases, characteristics of respective resins are exhibited.

In the case that, for example, printing ink is provided on the laminated film, the laminated layer of the laminated film may contain resins other than the above-described resins within the range of not impairing the desired effects.

For example, antioxidants, heat stabilizers, weathering stabilizers, ultraviolet absorbers, organic lubricants, pigments, dyes, organic or inorganic fine particles, fillers, antistatic agents, nucleating agents, and the like may also be compounded within the range of not impairing the effects.

There are various methods for providing a laminated layer on a thermoplastic resin film. In the case that the laminated film is prepared, a so-called in-line coating method may be suitable for use, in which application of a coating solution, drying, stretching, and a heat treatment are performed in a film formation step.

The adoption of the in-line coating method provides merits, for example, that the thickness of the laminated layer can be reduced and that the adhesion to a base film is increased, when compared with off-line processing. In particular, since the cross-linking agent (B) is used as an indispensable component, a heat treatment is required for the reaction of the cross-linking agent (B) and, therefore, the in-line coating method capable of performing a high-temperature heat treatment has a significant advantage. That is, in the in-line coating method capable of performing a high-temperature heat treatment, since both ends of a film are grasped with clips during the heat treatment, there is a merit that no wrinkle occurs in the laminated film and the flatness is maintained. On the other hand, in the off-line processing, wrinkles may occur in the film due to thermal shrinkage and the flatness of the film after processing may be significantly deteriorated. Preferably, the heat treatment in the in-line coating method is performed at 200° C. or more.

The thermoplastic resin film collectively refers to films which are melted or softened due to heat, and are not specifically limited. Typical examples of thermoplastic resin films may include polyester films; polyolefin films, e.g., polypropylene films and polyethylene films; polylactic acid films; polycarbonate films; acrylic films, e.g., polymethylmethacrylate films and polystyrene films; polyamide films, e.g., nylon; polyvinyl chloride films; polyurethane films; fluorine-based films; and polyphenylene sulfide films.

The thermoplastic resin films may be homopolymers or copolymers. Among them, polyester films, polypropylene films, polyamide films, and the like are preferable from the viewpoint of mechanical properties, the dimensional stability, the transparency, and the like. Furthermore, polyester films are particularly preferable from the viewpoint of mechanical properties, the general versatility, and the like.

The laminated film will be described below with reference to the polyester film as a typical example, although not limited to this.

With respect to the polyester film of the laminated film, polyester collectively refers to polymers in which ester bonding is a primary bonding chain in a main chain. Preferable polyesters include at least one constituent selected from the group consisting of ethylene terephthalate, propylene terephthalate, ethylene-2,6-naphthalate, butylene terephthalate, propylene-2,6-naphthalate, ethylene-α, β-bis(2-chlorophenoxy)ethane-4,4'-dicarboxylate, and the like as a primary constituent. These constituents may be used alone or in combination. Most of all, it is particularly preferable to use a polyester including ethylene terephthalate as a primary constituent, that is, polyethylene terephthalate, considering all the factors, e.g., quality and economy, involved. When the polyester is used for the purpose in which heat, shrinkage stress, and the like are applied to a base material, polyethylene-2,6-naphthalate having excellent heat resistant and stiffness is further preferable.

Other dicarboxylic acid components and diol components may be copolymerized as a part of these polyesters, preferably at 20 mole percent or less.

This polyester may contain various additives, e.g., antioxidants, heat stabilizers, weathering stabilizers, ultraviolet absorbers, organic lubricants, pigments, dyes, organic or inorganic fine particles, fillers, antistatic agents, and nucleating agents, to the extent that the characteristics are not deteriorated.

Preferably, inorganic particles, e.g., silica, colloidal silica, alumina, alumina sol, kaolin, talc, mica, calcium carbonate, barium sulfate, carbon black, zeolite, titanium oxide, and a fine metal powder, are added to the polyester film because the slidability is improved. Preferably, the average particle diameter of the inorganic particles is 0.005 to 3 μm, and more preferably is 0.05 to 1 μm. Preferably, the amount of addition of the inorganic particles is 0.001 to 5 percent by weight, and more preferably is 0.1 to 2 percent by weight.

The laminated film may be a composite film composed of at least two layers including an inner layer and a surface layer. The laminated film may be, for example, a composite film in which an inner layer portion contains substantially no particle, and a layer containing particles is provided in the surface layer portion, or a composite film in which an inner layer portion contains coarse particles and a surface layer portion contains fine particles. In the above-described composite film, the inner layer portion and the surface layer portion may be composed of different polymers or be composed of the same type of polymer.

Preferably, the intrinsic viscosity (measured in o-chlorophenol at 25° C.) of the above-described polyester is within the range of 0.4 to 1.2 dl/g, and more preferably is 0.5 to 0.8 dl/g.

In the state in which a laminated layer is provided, preferably, the polyester film including the above-described polyester has been biaxially oriented. In general, the biaxially oriented polyester film refers to a polyester film which is prepared by stretching a polyester sheet or film in a non-stretched state in a longitudinal direction and a width direction by about 2.5 to 5 times each and, thereafter, performing a heat treatment to complete crystalline orientation and which exhibits a wide-angle X-ray diffraction pattern attributed to biaxial orientation.

Preferably, the thickness of the laminated layer is usually 0.005 to 5 μm, more preferably is 0.01 to 1 μm, and most preferably is 0.03 μm to 0.5 μm. If the thickness of the laminated layer is too small, the antistatic property may become poor.

The thickness of the polyester film is not specifically limited, and is appropriately selected in accordance with the use of the laminated film. Preferably, the thickness is usually 1 to 500 μm, more preferably is 5 to 300 μm, and most preferably is 9 to 210 μm from the viewpoint of the mechanical strength, handleability, and the like. Furthermore, the resulting films may be used after being bonded together by various methods.

A laminated layer refers to a film-shaped layer provided to constitute a laminated structure and, thereby, presents on a surface of a thermoplastic resin film for serving as a base material. The layer itself may be a single layer or be composed of a plurality of layers.

A method for manufacturing a laminated film includes the steps of applying a coating solution containing a composition (A) and a cross-linking agent (B) to at least one surface of a thermoplastic resin film, and performing drying, stretching and, thereafter, heat-treating, wherein the composition (A) is a composition comprising a polythiophene and a polyanion or a composition comprising a polythiophene derivative and a polyanion, and 10 to 85 percent by weight of cross-linking agent (B) is contained in the coating solution.

In the method for manufacturing a laminated film, an in-line coating method is preferable as the coating method.

In the in-line coating method, for example, a melt-extruded polyester film before crystalline orientation is effected is stretched by 2.5 to 5 times in a longitudinal direction, and the resulting monoaxially oriented film is continuously coated with a coating solution. The coated film is dried while being passed through a stepwise-heated zone, and is stretched by 2.5 to 5 times in a width direction. Furthermore, the resulting film is continuously led to a heating zone at 150° C. to 250° C., and crystalline orientation is completed. In a general method, a film is stretched in a longitudinal direction, and after coating is performed, the film is stretched in a width direction. However, various methods may be used, and examples thereof include a method in which a film is stretched in a width direction, and after coating is performed, the film is stretched in a longitudinal direction and a method in which coating is performed and, thereafter, a film is stretched simultaneously in a longitudinal direction and in a width direction.

Before the coating solution is applied, preferably, a surface of a base film (the monoaxially oriented film in the above-described case) is subjected to a corona discharge treatment and the like in order that the wetting tension of the base film surface becomes preferably at least 47 mN/m, and more preferably at least 50 mN/m because the adhesion to the base film and the coating property of the laminated layer can be improved. It is also preferable that small amounts of organic solvent, e.g., isopropyl alcohol, butyl cellosolve, or N-methyl-2-pyrrolidone, is contained in the coating solution and, thereby, the wettability and the adhesion to the base film is improved.

Various coating method may be used as the method for coating the base film. Examples of coating methods may include a reverse coating method, a gravure coating method, a rod coating method, a bar coating method, a Meyer bar coating method, a die coating method, and a spray coating method.

In the method for manufacturing a laminated film, preferably, the cross-linking agent (B) is a water-soluble cross-linking agent.

The method for manufacturing a laminated film will be described below in further detail with reference to the example in which polyethylene terephthalate (hereafter abbreviated as "PET") is used as the base film, although not limited to this.

The method for manufacturing a laminated film will be described with reference to further specific example.

PET pellets having a intrinsic viscosity of 0.5 to 0.8 dl/g are vacuum-dried and, thereafter, are supplied to an extruder. The pellets are melted at 260° C. to 300° C., and are extruded from a T-die into the shape of a sheet. The resulting sheet is wound around a mirror-finished casting drum having a surface temperature of 10° C. to 60° C. by the use of an electrostatic casting method, followed by cooling and solidifying, so that a non-stretched PET film is prepared. This non-stretched film is stretched by 2.5 to 5 times in a longitudinal direction (film traveling direction) between rolls heated to 70° C. to 120° C. At least one surface of this film is subjected to a corona discharge treatment in order that the wetting tension of the surface becomes at least 47 mN/m, and the treated surface is coated with the water-based coating solution. This coated film is grasped with clips, and is led to a hot-air zone heated to 70° C. to 150° C. After drying is performed, the film is stretched by 2.5 to 5 times in a width direction, and subsequently, is led to a heat treatment zone at 160° C. to 250° C. A heat treatment is performed for 1 to 30 seconds, so that crystalline orientation is completed. If necessary, a treatment for relaxation of 1 to 10 percent in a width direction or a longitudinal direction may be performed during this heat treatment step. Biaxial stretching may be performed successively in a longitudinal direction and in a width direction, or simultaneous biaxial stretching may be performed. After stretching is performed in a longitudinal direction and in a width direction, re-stretching may be performed in any one of the longitudinal direction and the width direction. The thickness of the polyester film is not specifically limited, but preferably, the thickness is 1 to 500 μm.

When the base film to be provided with the laminated layer is allowed to contain at least one material selected from a laminated layer-forming composition or reaction products of the laminated layer-forming composition, the adhesion between the laminated layer and the base film can be improved, and the slidability of the laminated polyester film can be improved. With respect to the amount of addition of the laminated layer-forming composition or reaction products thereof, preferably, a total of the amounts of addition is 5 ppm or more and less than 20 percent by weight from the viewpoint of the adhesion and the slidability. In consideration of environmental protection and productivity, a method in which recycled pellets containing the laminated layer-forming composition are used is suitable.

The laminated film is particularly suitable for use as a laminated film for a protective film. An adhesive layer may be provided on at least one surface of the laminated film, so that a protective film may be provided.

The laminated film is particularly suitable for use as a laminated film for a cover tape. A layer composed of a polyolefin-based resin and/or an adhesive layer having a thickness of 0.5 to 20 μm may be provided on at least one surface of the laminated film, so that a cover tape having excellent characteristics may be provided.

The laminated film is particularly suitable for use as a laminated film for a carrier package. A carrier tape may be laminated on at least one surface of the laminated film, so that a carrier package may be provided.

A laminated film for a protective film is manufactured by a method including the steps of applying a coating solution containing a composition (A) and a cross-linking agent (B) to at least one surface of a thermoplastic resin film, and performing drying, stretching and, thereafter, heat-treating, wherein the composition (A) is a composition comprising a polythiophene and a polyanion or a composition comprising a polythiophene derivative and a polyanion, and 25 to 85 percent by weight of cross-linking agent (B) is contained in the coating solution.

In the laminated film for a protective film, preferably, the cross-linking agent (B) is a water-soluble cross-linking agent.

With respect to the laminated film for a protective film, preferably, the haze is 2 percent or less. In particular, when the film is used for components related to liquid crystal displays, if the haze exceeds 2 percent, problems occur in that the light transmission is reduced, the luminance is reduced, the image becomes blurred, and the like. More preferably, the haze is 1.5 percent or less, and most preferably is 1 percent or less.

With respect to the laminated film for a protective film, preferably, the thermal shrinkage is −0.5 percent or more and 1 percent or less. In particular, when the film is used for components related to liquid crystal displays, since the film may be affixed to a display screen by a heat treatment, e.g., autoclaving, or a heat treatment may be performed to provide an adhesive layer, it is important that occurrence of thermal shrinkage of the protective film itself is minimized. The protective film in the state of being affixed may become commercial or may be used without being processed. At this time, the thermal shrinkage is an important characteristic because of, for example, heat generation by a display itself and harsh use environments, e.g., a high temperature condition during car navigation use in the interior of a car. When the thermal shrinkage is −0.5 percent or more and 1 percent or less, no distortion occurs during inspection, and no distortion occurs in an image. A smaller thermal shrinkage is preferable, and a thermal shrinkage of 0 percent to 0.5 percent is more preferable. A negative thermal shrinkage indicates that the film expands, as described in the item of evaluation.

An adhesive layer is provided on at least one surface of the laminated film for a protective film and, thereby, a protective film having excellent characteristics is provided.

That is, the protective film may be produced by providing the adhesive layer on the above-described laminated film for a protective film.

The type of the adhesive layer is not specifically limited as long as the layer has adhesion property, and rubber-based adhesives, acrylic adhesives, vinyl-based adhesives, polyester-based adhesives, silicone-based, and the like may be used. For example, the rubber-based adhesive to be used may primarily contain a rubber elastomer, a softener, and a tackifier, and if necessary, a filler and an antioxidant may be added. The acrylic adhesive to be used may primarily contain an acrylate, e.g., butyl acrylate, 2-ethylhexyl acrylate, or the like, and in order to adjust a cohesive force, vinyl acetate, ethylene-acrylic acid, or the like may be copolymerized. The silicone-based adhesive to be used may primarily contain a mixture of rubber-like siloxane and a polymer of resin-like siloxane.

The method for providing the adhesive layer is not specifically limited. However, methods through the use of coating are suitable, and a die coating method, a doctor blade method, a gravure coating method, and the like may be used. The thickness of the adhesive layer is not specifically limited. However, adhesive layers having thicknesses within the range of 0.5 to 20 µm are suitable for use.

Preferably, the adhesive layer is imparted with an antistatic property, and antistatic agents, e.g., carbon black, tin oxide, antimony-doped tin oxide, polythiophene, and polyaniline, may be used. Tin oxide-based antistatic agents are suitable in consideration of the transparency.

When the protective film is manufactured, an adhesive layer is provided on the protective film. An adhesive constituting this adhesive layer may lie off the edge so as to adhere to the protective film surface. Furthermore, lubricating oil and the like in the process may also adhere to the surface. In an inspection step to determine whether adherents, e.g., an adhesive and lubricating oil, makes defects of a liquid crystal polarizer itself or not, when the protective film is affixed to the polarizer or the like the workability may be deteriorated and defects may be missed. In order to prevent this, in most instances, for example, small amounts of alcohol, e.g., ethanol, or general-purpose organic solvent, e.g., methyl ethyl ketone or toluene, is used, and the surface side of the liquid crystal polarizer is lightly wiped clean. At this time, if the laminated layer used for the protective film has no solvent resistance, the laminated layer surface is attacked by the above-described organic solvent, and problems occur in that, for example, the laminated layer is whitened and fallen off and, thereby, the inspection with the polarizer becomes impossible.

A cross-linking agent, most of all, an epoxy-based cross-linking agent, is used preferably as an indispensable component of the laminated layer and, thereby, the cross-linking property is very high. In addition, since polyanions serving as dopants of polythiophene, for example, polystyrenesulfonic acid, are present, cross-linking reaction advances very speedily at a temperature of the heat treatment performed after the in-line coating, very high degree of cross-linking structure is formed and, thereby, the solvent resistance of the laminated layer is exhibited.

A laminated film for a cover tape is manufactured by a method including the steps of applying a coating solution containing a composition (A) and a cross-linking agent (B) to at least one surface of a thermoplastic resin film, and performing drying, stretching and, thereafter, heat-treating, wherein the composition (A) is a composition comprising a polythiophene and a polyanion or a composition comprising a polythiophene derivative and a polyanion, and 10 to 85 percent by weight of cross-linking agent (B) is contained in the coating solution. In the laminated film for a cover tape, preferably, the cross-linking agent (B) is a water-soluble cross-linking agent.

A polyolefin resin layer and/or an adhesive layer is provided on at least one surface of the laminated film for a cover tape and, thereby, a cover tape having excellent characteristics may be provided.

With respect to the cover tape, resins having a heat sealing property, e.g., polyethylenes, polypropylenes, ethylene propylene copolymers, polystyrenes, and cyclohexanedimethanol copolymerization polyesters, may be suitable for use as the polyolefin-based resin. Among them, polyethylenes are most preferable from the viewpoint of general versatility and moldability.

The adhesive layer used for the cover tape is not specifically limited as long as the layer has adhesion properties, and rubber-based adhesives, acrylic adhesives, vinyl-based adhesives, polyester-based adhesives, silicone-based, and the like may be used. For example, the rubber-based adhesive to be used may primarily contain a rubber elastomer, a softener, and a tackifier, and if necessary, a filler and an antioxidant may be added. The acrylic adhesive to be used may primarily contain an acrylate, e.g., butyl acrylate, 2-ethylhexyl acrylate, or the like, and in order to adjust a cohesive force, vinyl acetate, ethylene-acrylic acid, or the like may be copolymerized. The silicone-based adhesive to be used may primarily contain a mixture of rubber-like siloxane and a polymer of resin-like siloxane.

In the cover tape, the method for providing the polyolefin-based resin layer and/or the adhesive layer is not specifically limited. For example, methods through the use of coating, a lamination method, a heat sealing method, and a coextrusion method may be used, and the lamination method is most suitable, in which a polyethylene resin sheet or film is laminated through the use of heat or the like. The thickness of the polyolefin-based resin layer and/or an adhesive layer is usually 0.5 to 20 µm, preferably is 2 to 15 µm, more preferably is 5 to 12 µm. If the polyolefin-based resin layer and/or the adhesive layer is too thin, the heat sealing effect cannot be exhibited, and, in addition, the handling during lamination becomes difficult. On the other hand, if the thickness is too large, a carrier package taken up into the shape of a reel becomes too large and, in addition, since the heat transfer during heat sealing becomes inadequate, variations may occur in heat sealing force and unexpected troubles may occur.

In the cover tape, preferably, the contact angle of water on the surface of the polyolefin-based resin layer and/or an adhesive layer is 80 to 110 degrees, and more preferably is 85 to 105 degrees. Here, the surface of the polyolefin-based resin layer and/or the adhesive layer refers to the surface in the side laminated on the carrier tape, while the contact angle of water on the surface is measured. The cover tape in the state of being laminated on the carrier tape by heat lamination or the like so as to constitute the carrier package is peeled off the carrier tape and, thereafter, the contact angle of water on the surface is measured.

When the contact angle of water on the surface of the polyolefin-based resin layer and/or the adhesive layer is 80 to 110 degrees, the affinity with the resin constituting the carrier tape is adequate, and the heat sealing force as the cover tape does not become short. On the other hand, no detrimental effect, e.g., the difficulty in peeling or the susceptibility to peeling electrification, due to excessively high heat sealing property relative to the carrier tape is exhibited.

Preferably, the polyolefin-based resin layer and/or the adhesive layer is also imparted with an antistatic property, and antistatic agents, e.g., carbon black, tin oxide, antimony-doped tin oxide, polythiophene, and polyaniline, may be used. Tin oxide-based antistatic agents are suitable in consideration of the transparency.

A polyolefin-based resin layer and/or an adhesive layer of 0.5 to 20 µm in thickness is provided on at least one surface of the laminated film for a cover tape, and a carrier tape is laminated on the polyolefin-based resin layer and/or the adhesive layer, so that a carrier package may be provided.

The method for laminating the carrier tape on the polyolefin-based resin layer and/or the adhesive layer is not specifically limited, and a method, for example, a heat sealing method and a lamination method, similar to that used in the above-described manufacture of the cover tape may be used.

At this time, recessed portions to store electronic components and the like may be provided in the carrier tape and the like in advance.

With respect to the above-described recessed portions to store electronic components, the recessed portions adjusted to the shape of the electronic components to be inserted, for example, IC chips and capacitors, are formed by molding with a molding machine, so that a carrier tape may be provided. The above-described cover tape and the carrier tape in the state of including electronic components may be laminated by heat sealing or the like, so that a carrier package may be provided.

Since the recessed portions to store electronic components and the like are provided in the carrier tape and the like in advance, when the laminated film for a cover tape is used for the cover tape and the carrier package, peeling electrification during peeling from the carrier tape is suppressed at an extremely high suppression level. Consequently, excellent characteristics can be exhibited, for example, electronic components, e.g., IC circuits, in the carrier tape are not released, and no discharge occurs due to accumulation of electrification charge.

Methods for measuring characteristics and methods for evaluating desired effects are as described below.

(1) Thickness of Laminated Layer

A transmission electron microscope Model HU-12 produced by Hitachi, Ltd., was used. The thickness was determined from a photograph based on the observation of a cross section of a laminated polyester film provided with a laminated layer. An average value of 30 measurements in a measurement field of view was taken as the thickness.

(2) Transparency

The transparency was measured based on the haze. A laminated film was stood for 2 hours at normal conditions (23° C., relative humidity 65 percent) and, thereafter, the haze was measured with a fully automatic direct-reading Haze Computer "HGM-2DP" produced by SUGA TEST INSTRUMENTS Co., Ltd. An average value of 3 measurements was taken as the haze value of the sample.

(3) Antistatic Property

The antistatic property was measured based on the surface resistivity. A sample was stood for 24 hours at normal conditions (23° C., relative humidity 65 percent) and, in that atmosphere, after application of an applied voltage of 100 V for 10 seconds, the surface resistivity was measured with a digital super-high resistance/microammeter R8340A (produced by ADVANTEST CORPORATION). The unit is $\Omega/\square$. When the level of the surface resistivity is $1\times10^{12}$ $\Omega/\square$ or less, no problem occurs in practice. When the surface resistivity is $1\times10^{10}$ $\Omega/\square$ or less, in particular is $1\times10^{9}$ $\Omega/\square$ or less, excellent antistatic property is exhibited.

In addition, an evaluation similar to that described above was also performed at a relative humidity of 25 percent, so that an evaluation to check the humidity dependence was performed.

(4) Water Resistance

After a laminated film was exposed to running tap water for 1 minute, air drying was performed at 40° C. for 10 minutes. Subsequently, the antistatic property was evaluated as described in the item (3). The laminated film which exhibits small difference between the antistatic property before subjected to the water resistance evaluation and the antistatic property after subjected to the water resistance evaluation is a laminated film having excellent water resistance.

(5) Scratch Resistance

A laminated layer provided on a thermoplastic resin film was scratched with a nail, and the degree of the damage was visually evaluated as described below. Symbols (⊙) and (○) indicate good scratch resistance.

(⊙): no damage (○): a scratch mark is left on the laminated layer (Δ): the laminated layer is gouged by scratching with a nail (x): the laminated layer is scraped and powder-like shavings are formed (6) Observation of Cross Section of Laminated Layer An extremely thin slice was cut out perpendicularly to a film surface of a laminated film, and the resulting laminated film was stained by osmic acid ($OSO_4$). The laminated layer portion in the extremely thin slice stained by osmic acid was observed with a transmission electron microscope (H-7100FA, produced by Hitachi, Ltd.) at an acceleration voltage of 100 kV.

It was checked by the following method whether each of components used for the laminated layer had stainability with osmic acid or had no stainability with osmic acid.

Comparative Sample (1):

a sample prepared by applying a complex composed of polyethylenedioxythiophene/polystyrenesulfonic acid to a PET film, followed by drying Comparative Sample (2):

a sample prepared by applying an epoxy cross-linking agent to a PET film, followed by drying Here, two samples were further prepared with respect to Comparative sample (1).

Comparative Sample (1)-1:

a sample subjected to TEM cross-sectional observation without being stained by osmic acid Comparative Sample (1)-2:

a sample subjected to TEM cross-sectional observation after being stained by osmic acid When TEM cross-sectional observation images of Comparative sample (1)-1 and Comparative sample (1)-2 were compared, no difference in concentration was recognized between the two. Consequently, it was ascertained that the compound used in Comparative sample (1), which was the complex composed of polyethylenedioxythiophene/polystyrenesulfonic acid, was not stained by osmic acid.

When a TEM cross-sectional observation image of Comparative sample (2) was compared with that of Comparative sample (1), Comparative sample (2) was stained clearly at a high concentration. Consequently, it was ascertained that the epoxy cross-linking agent, which was a compound used in Comparative sample (2), was stained by osmic acid.

(7) Solvent Resistance

With respect to the laminated layer of the laminated film or the laminated layer of the protective film, the solvent resistance was evaluated based on the following criteria, wherein three types of general-purpose organic solvent including ethanol (represented by solvent "1" in the Table), methyl ethyl ketone (represented by solvent "2" in the Table), and toluene (represented by solvent "3" in the Table) were used.

An end of a cotton swab was impregnated with each of the above-described organic solvents, the angle of the cotton swab was maintained at 45 degrees, and the cotton swab was allowed to reciprocate 10 times under a load of iN at a speed of 6 cm/sec over distances of 3 cm on the laminated layer. Thereafter, the state of the laminated layer was visually observed. The laminated layer rated as 4 or 5 has good solvent resistance.

rating 5: no change is observed rating 4: scuffs are observed to some extent, but the laminated layer remains rating 3: the laminated layer is partially taken off rating 2: a thin line shaped portion is taken off the laminated layer.

rating 1: all portions rubbed with the cotton swab are taken off the laminated layer.

(8) Thermal Shrinkage

The measurement was performed in accordance with JIS C 2318, as described below.

With respect to a laminated film, in particular, a laminated film for a protective film, the laminated film was cut into the size of about 200 mm×about 10 mm, the resulting sample was stood for 8 hours in an atmosphere at 23° C. and a relative humidity of 65 percent and, thereafter, two points spaced about 150 mm in a longitudinal direction were marked on the sample. The spacing between the marks was measured with a linear scale length measuring machine, and the value was indicated by $A_0$. Likewise, two points spaced about 70 mm in a direction orthogonal to the longitudinal direction were marked on the sample, and the value thereof was indicated by $B_0$. The sample was stood for 30 minutes in an atmosphere at 150° C. and, thereafter, was stood again for 8 hours at 23° C. and a relative humidity of 65 percent. In that atmosphere, the spacing between the above-described two marks was measured, and the values in the longitudinal direction and in the direction orthogonal thereto were indicated by A and B, respectively. At this time, the thermal shrinkage was determined as an average thereof based on the following equation.

thermal shrinkage (percent)=$100\times((A_0-A)/A_0+(B_0-B)/B_0)$ (9) Scratch Resistance-2

The laminated film, in particular, the laminated film for a cover tape is used for the purpose of including electronic components. Therefore, shavings, a residue, and the like of the laminated layer cause extremely significant troubles. Consequently, the scratch resistance of the laminated layer is an important characteristic.

A model for the scratching during processing step was formulated, and a sample of 25 mm in width and 50 cm in length was prepared. A cylindrical stainless steel bar of 6 mm in diameter was loaded with 5 N, and was allowed to reciprocate 20 times on the laminated layer surface of the laminated film. Subsequently, the state of the laminated layer powder and the like adhered to the bar and the state of the coating film was observed, so that the scratch resistance was evaluated. The criteria of evaluation are as described below, and the rating of at least 4 indicates good scratch resistance.

rating 5: no powder is adhered to the bar, nor is damage observed on the laminated layer rating 4: no powder is adhered to the bar, but damage is observed slightly on the laminated layer rating 3: a powder is adhered to the bar, and damage is observed on the laminated layer rating 2: large amounts of powder is adhered to the bar, and damage is observed on the laminated layer rating 1: large amounts of powder is adhered to the bar, and the laminated layer has almost fallen off

(10) Measurement of Contact Angle

A sample was stood for 24 hours at normal conditions (23° C., relative humidity 65 percent) and, in that atmosphere, the contact angle was measured with a contact angle meter Model CA-D (produced by KYOWA INTERFACE SCIENCE CO., LTD.) through the use of distilled water which had been stored under similar conditions. An average value of 10 samples were taken as the measurement value.

(11) Static Voltage

A sample was stood for 24 hours at normal conditions (23° C., relative humidity 65 percent). In that atmosphere, an honestmeter ("STATIC HONESTMETER" TYPE S-5109 produced by SHISHIDO ELECTROSTATIC, LTD.) was used, and after application of an applied voltage of 10 V for 12 seconds at an irradiation height of 2 cm, with respect to the electric charge attenuation behavior of the sample at a detection height of 2 cm, the elapsed time (sec) after the application and the static voltage (V) of the sample were plotted by the use of a recorder. The number of revolutions of a turn table was 1,550 rpm.

EXAMPLES

The films will be described below with reference to examples. However, the films are not limited to them.

Example 1

PET pellets (intrinsic viscosity 0.63 dl/g) containing 0.015 percent by weight of colloidal silica having an average particle diameter of 0.4 μm and 0.005 percent by weight of colloidal silica having an average particle diameter of 1.5 μm were adequately vacuum-dried and, thereafter, were supplied to an extruder. The pellets were melted at 285° C., and were extruded from a T-die into the shape of a sheet. The resulting sheet was wound around a mirror-finished casting drum having a surface temperature of 25° C. by the use of an electrostatic casting method, followed by cooling and solidifying. The resulting non-stretched film was heated to 92° C., and was stretched by 3.3 times in a longitudinal direction, so that a monoaxially stretched film was prepared. This film was subjected to a corona discharge treatment in air in order that the wetting tension of the base film became 55 mN/m, and the treated surface was coated with a laminated layer-forming coating solution described below. The coated monoaxially stretched film was grasped with clips, and was led to a preheating zone. After drying was performed at 90° C., the film was continuously stretched by 3.8 times in a width direction in a heating zone at 90° C., and furthermore, was subjected to a heat treatment in a heating zone at 225° C., so that a laminated PET film was prepared, wherein crystalline orientation was completed. At this time, the thickness of the base PET film was 38 μm, and the thickness of the laminated layer was 0.02 μm. The results are shown in Table 1. Excellent transparency, antistatic property, and water resistance were exhibited. A TEM cross-section observation image of the laminated layer of the present Example is shown in FIG. 2. A "sea" portion made of a complex composed of polyethylenedioxythiophene/polystyrenesulfonic acid and "island" portions composed of an epoxy cross-linking agent were observed, so that the laminated layer had a sea-island structure.

"Laminated Layer-Forming Coating Solution"

Coating Solution A1:

a water-based coating solution ("DENATRON" #5002SZ produced by Nagase ChemteX Corporation) in which a fluorine-based surfactant was added to a complex composed of polyethylenedioxythiophene/polystyrenesulfonic acid.

Coating Solution B1:

a water-based coating solution in which polyglycerol polyglycidyl ether-based epoxy cross-linking agent ("DENACOL" EX-512 produced by Nagase ChemteX Corporation (molecular weight about 630, weight per epoxy equivalent 168, water solubility 100 percent)) serving as an epoxy cross-linking agent was dissolved in water.

A laminated layer-forming coating solution was prepared by mixing the above-described Coating solution A1 and Coating solution B1 at a ratio of Coating solution A1/Coating solution B1=10/90 on a weight of solid basis.

Example 2

PET pellets (intrinsic viscosity 0.63 dl/g) containing 0.015 percent by weight of colloidal silica having an average particle diameter of 0.4 μm and 0.005 percent by weight of colloidal silica having an average particle diameter of 1.5 μm were adequately vacuum-dried and, thereafter, were supplied to an extruder. The pellets were melted at 285° C., and were extruded from a T-die into the shape of a sheet. The resulting sheet was wound around a mirror-finished casting drum having a surface temperature of 25° C. by the use of an electrostatic casting method, followed by cooling and solidifying. The resulting non-stretched film was heated to 92° C., and was stretched by 3.3 times in a longitudinal direction, so that a monoaxially stretched film was prepared. This film was subjected to a corona discharge treatment in air in order that the wetting tension of the base film became 55 mN/m, and the treated surface was coated with a laminated layer-forming coating solution described below. The coated monoaxially stretched film was grasped with clips, and was led to a preheating zone. After drying was performed at 90° C., the film was continuously stretched by 3.8 times in a width direction in a heating zone at 90° C., and furthermore, was subjected to a heat treatment in a heating zone at 225° C., so that a laminated PET film was prepared, wherein crystalline orientation was completed. At this time, the thickness of the base PET film was 38 μm, and the thickness of the laminated layer was 0.05 μm. The results are shown in Table 1. Excellent transparency, antistatic property, and water resistance were exhibited.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B2:

a water-based coating solution in which sorbitol polyglycidyl ether-based epoxy cross-linking agent ("DENACOL" EX-614B produced by Nagase ChemteX Corporation (molecular weight about 550, weight per epoxy equivalent 173, water solubility 94 percent)) serving as an epoxy cross-linking agent was dissolved in water.

A laminated layer-forming coating solution was prepared by mixing the above-described Coating solution A2 and Coating solution B2 at a ratio of Coating solution A2/Coating solution B2=20/80 on a weight of solid basis.

Example 3

A laminated film was prepared as in Example 2 except that Coating solution A2 and Coating solution B3 were used in the laminated layer-forming coating solution in Example 2. The results are shown in Table 1. Excellent transparency, antistatic property, and water resistance were exhibited.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B3:

a water-based coating solution in which polyglycerol polyglycidyl ether-based epoxy cross-linking agent ("DENACOL" EX-521 produced by Nagase ChemteX Corporation (molecular weight about 1,000, weight per epoxy equivalent 183, water solubility 100 percent)) serving as an epoxy cross-linking agent was dissolved in water.

A laminated layer-forming coating solution was prepared by mixing the above-described Coating solution A2 and Coating solution B3 at a ratio of Coating solution A2/Coating solution B3=20/80 on a weight of solid basis.

Example 4

A laminated film was prepared as in Example 2 except that Coating solution A2 and Coating solution B1 were used in the laminated layer-forming coating solution in Example 2. The results are shown in Table 1. Excellent transparency, antistatic property, and water resistance were exhibited and, in addition, extremely excellent scratch resistance was exhibited.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B1:

a water-based coating solution in which polyglycerol polyglycidyl ether-based epoxy cross-linking agent ("DENACOL" EX-512 produced by Nagase ChemteX Corporation (molecular weight about 630, weight per epoxy equivalent 168, water solubility 100 percent)) serving as an epoxy cross-linking agent was dissolved in water.

A laminated layer-forming coating solution was prepared by mixing the above-described Coating solution A2 and Coating solution B1 at a ratio of Coating solution A2/Coating solution B1=15/85 on a weight of solid basis.

Example 5

A laminated film was prepared as in Example 2 except that Coating solution A2 and Coating solution B1 were used in the laminated layer-forming coating solution in Example 2, while Coating solution A2 and Coating solution B1 were used after mixing at a ratio of 20/80 (weight ratio of solid). The results are shown in Table 1. Excellent transparency, antistatic property, and water resistance were exhibited.

Example 6

A laminated film was prepared as in Example 2 except that Coating solution A2 and Coating solution B1 were used in the laminated layer-forming coating solution in Example 2, while Coating solution A2 and Coating solution B1 were used after mixing at a ratio of 30/70 (weight ratio of solid). The results are shown in Table 1. Excellent transparency, antistatic property, and water resistance were exhibited.

Example 7

A laminated film was prepared as in Example 2 except that Coating solution A2 and Coating solution B1 were used in the laminated layer-forming coating solution in Example 2, while Coating solution A2 and Coating solution B1 were used after mixing at a ratio of 50/50 (weight ratio of solid). The results are shown in Table 1. Excellent transparency, antistatic property, and water resistance were exhibited.

Example 8

A laminated film was prepared as in Example 2 except that Coating solution A2 and Coating solution B1 were used in the laminated layer-forming coating solution in Example 2, while Coating solution A2 and Coating solution B1 were used after mixing at a ratio of 75/25 (weight ratio of solid). The results are shown in Table 1. Excellent transparency, antistatic property, and water resistance were exhibited.

Example 9

A laminated film was prepared as in Example 2 except that Coating solution A2 and Coating solution B1 were used in the laminated layer-forming coating solution in Example 2, while Coating solution A2 and Coating solution B1 were used after mixing at a ratio of 90/10 (weight ratio of solid). The results are shown in Table 1. Excellent transparency, antistatic property, and water resistance were exhibited.

Example 10

A laminated film was prepared as in Example 2 except that Coating solution A2 and Coating solution B1 were used in the laminated layer-forming coating solution in Example 2, while Coating solution A2 and Coating solution B1 were used after mixing at a ratio of 25/75 (weight ratio of solid) and the thickness of the laminated layer was controlled at 0.025 µm. The results are shown in Table 1. Excellent transparency, antistatic property, and water resistance were exhibited.

Example 11

A laminated film was prepared as in Example 2 except that Coating solution A2 and Coating solution B4 were used in the laminated layer-forming coating solution in Example 2 and the thickness of the laminated layer was controlled at 0.07 µm. The results are shown in Table 1. Excellent transparency, antistatic property, and water resistance were exhibited and, in addition, excellent scratch resistance was exhibited as well.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B4:

a water-based coating solution in which polyglycerol polyglycidyl ether-based epoxy cross-linking agent ("DENACOL" EX-810 produced by Nagase ChemteX Corporation (molecular weight about 180, weight per epoxy equivalent 113, water solubility 100 percent)) serving as an epoxy cross-linking agent was dissolved in water.

A laminated layer-forming coating solution was prepared by mixing the above-described Coating solution A2 and Coating solution B4 at a ratio of Coating solution A2/Coating solution B4=50/50 on a weight of solid basis.

Example 12

A laminated film was prepared as in Example 2 except that Coating solution A2 and Coating solution B5 were used in the laminated layer-forming coating solution in Example 2. The results are shown in Table 1. Excellent transparency, antistatic property, and water resistance were exhibited and, in addition, excellent scratch resistance was exhibited as well.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B5:

a water-based coating solution in which methylol type melamine cross-linking agent ("NIKALAC" MW12LF produced by SANWA CHEMICAL CO., LTD. (molecular weight about 340)) serving as a melamine-based cross-linking agent was dissolved in water.

A laminated layer-forming coating solution was prepared by mixing the above-described Coating solution A2 and Coating solution B5 at a ratio of Coating solution A2/Coating solution B5=50/50 on a weight of solid basis.

Comparative Example 1

A laminated PET film was prepared as in Example 2 except that the following laminated layer-forming coating solution was used in the laminated layer-forming coating solution in Example 2 and the thickness of the laminated layer was controlled at 0.07 µm. The results are shown in Table 1. The coating film was whitened and was susceptible to scratching, and in addition, an extremely poor antistatic property was exhibited.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

The above-described Coating solution A2 was used alone as the laminated layer-forming coating solution.

Comparative Example 2

A laminated PET film was prepared as in Comparative example 1 except that the thickness of the laminated layer was controlled at 0.025 µm in Comparative example 1. The results are shown in Table 1. The coating film was whitened and was susceptible to scratching, and in addition, an extremely poor antistatic property was exhibited.

Comparative Example 3

A laminated PET film was prepared as in Example 2 except that the following laminated layer-forming coating solution was used as the laminated layer-forming coating solution in Example 2. The results are shown in Table 1. Since no cross-linking agent (B) was used in the present Comparative example, an extremely poor antistatic property was exhibited.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution C1:

A water-based dispersion (so-called "latex"-like coating solution, water solubility: 1 percent or less) in which a granular polyester resin (glass transition temperature: 21° C.) composed of the following copolymer composition was dispersed in water.

| Acid components | |
|---|---|
| terephthalic acid | 10 mole percent |
| isophthalic acid | 78 mole percent |
| 5-sodium sulfoisophthalic acid | 12 mole percent |
| Diol components | |
| ethylene glycol | 5 mole percent |
| diethylene glycol | 75 mole percent |
| neopentyl glycol | 20 mole percent |

A laminated layer-forming coating solution was prepared by mixing the above-described Coating solution A2 and Coating solution C1 at a ratio of Coating solution A2/Coating solution C1=20/80 on a weight of solid basis.

Comparative Example 4

A laminated PET film was prepared as in Example 2 except that the following laminated layer-forming coating solution was used as the laminated layer-forming coating solution in Example 2. The results are shown in Table 1. Since no cross-linking agent (B) was used in the present Comparative example, the transparency was poor, and the antistatic property was inadequate.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution C2:

a water-based dispersion (so-called "latex"-like coating solution, water solubility: 1 percent or less) in which a granular acrylic resin (glass transition temperature: 42° C.) composed of the following copolymer composition was dispersed in water.

| Copolymer components | |
| --- | --- |
| methyl methacrylate | 62 mole percent |
| ethyl acrylate | 35 mole percent |
| acrylic acid | 1 mole percent |
| N-methylolacrylamide | 2 mole percent |

A laminated layer-forming coating solution was prepared by mixing the above-described Coating solution A2 and Coating solution C2 at a ratio of Coating solution A2/Coating solution C2=80/20 on a weight of solid basis.

Comparative Example 5

A laminated PET film was prepared as in Example 2 except that the following laminated layer-forming coating solution was used as the laminated layer-forming coating solution in Example 2. The results are shown in Table 1. Since the composition (A) and cross-linking agent (B) were not used in the present Comparative example, the humidity dependence was significant, a poor antistatic property was exhibited particularly at a low humidity, and no water resistance was exhibited.

"Laminated Layer-Forming Coating Solution"

Coating Solution D1:

a water-based coating solution in which ammonium polystyrenesulfonate (weight average molecular weight: 65,000) was dissolved in water.

Coating Solution C2:

a water-based dispersion (so-called "latex"-like coating solution, water solubility: 1 percent or less) in which a granular acrylic resin (glass transition temperature: 42° C.) composed of the following copolymer composition was dispersed in water.

| Copolymer components | |
| --- | --- |
| methyl methacrylate | 62 mole percent |
| ethyl acrylate | 35 mole percent |
| acrylic acid | 1 mole percent |
| N-methylolacrylamide | 2 mole percent |

A laminated layer-forming coating solution was prepared by mixing the above-described Coating solution D1 and Coating solution C2 at a ratio of Coating solution D1/Coating solution C2=25/75 on a weight of solid basis.

TABLE 1

| | Laminated layer composition Coating solution | Mixing ratio (Weight ratio of solid) | Laminated layer thickness (μm) | Haze (%) | Antistatic property | | Water resistance | Scratch resistance |
| --- | --- | --- | --- | --- | --- | --- | --- | --- |
| | | | | | Relative humidity 65% | Relative humidity 25% | | |
| Example 1 | A1/B1 | 15/85 | 0.02 | 1.2 | $1 \times 10^8$ | $1 \times 10^8$ | $2 \times 10^8$ | ○ |
| Example 2 | A2/B2 | 20/80 | 0.05 | 1.2 | $2 \times 10^8$ | $2 \times 10^8$ | $2 \times 10^8$ | ○ |
| Example 3 | A2/B3 | 20/80 | 0.05 | 2.5 | $4 \times 10^8$ | $5 \times 10^8$ | $4 \times 10^8$ | ○ |
| Example 4 | A2/B1 | 15/85 | 0.05 | 1.0 | $2 \times 10^9$ | $3 \times 10^9$ | $4 \times 10^9$ | ⊙ |
| Example 5 | A2/B1 | 20/80 | 0.05 | 1.2 | $1 \times 10^8$ | $1 \times 10^8$ | $1 \times 10^8$ | ⊙ |
| Example 6 | A2/B1 | 30/70 | 0.05 | 1.3 | $3 \times 10^7$ | $3 \times 10^7$ | $3 \times 10^7$ | ○ |
| Example 7 | A2/B1 | 50/50 | 0.05 | 1.4 | $1 \times 10^7$ | $1 \times 10^7$ | $1 \times 10^7$ | ○ |
| Example 8 | A2/B1 | 75/25 | 0.05 | 1.9 | $8 \times 10^6$ | $8 \times 10^6$ | $9 \times 10^6$ | ○ |
| Example 9 | A2/B1 | 90/10 | 0.05 | 4.8 | $5 \times 10^7$ | $5 \times 10^7$ | $8 \times 10^7$ | ○ |
| Example 10 | A2/B1 | 25/75 | 0.025 | 1.1 | $3 \times 10^8$ | $4 \times 10^8$ | $4 \times 10^8$ | ○ |
| Example 11 | A2/B4 | 50/50 | 0.07 | 1.3 | $1 \times 10^7$ | $1 \times 10^7$ | $1 \times 10^7$ | ⊙ |
| Example 12 | A2/B5 | 50/50 | 0.05 | 4.5 | $1 \times 10^{10}$ | $3 \times 10^{10}$ | $1 \times 10^{10}$ | ○ |
| Comparative example 1 | A2 | Application of A2 alone | 0.07 | 24 | $2 \times 10^{15}$ | $3 \times 10^{15}$ | $4 \times 10^{14}$ | X |
| Comparative example 2 | A2 | Application of A2 alone | 0.025 | 4.7 | $1 \times 10^{16}$ | $2 \times 10^{16}$ | $3 \times 10^{14}$ | Δ |
| Comparative example 3 | A2/C1 | 20/80 | 0.05 | 2.5 | $4 \times 10^{14}$ | $5 \times 10^{14}$ | $6 \times 10^{13}$ | ⊙ |
| Comparative example 4 | A2/C2 | 80/20 | 0.05 | 13 | $6 \times 10^{12}$ | $8 \times 10^{12}$ | $8 \times 10^{12}$ | ○ |
| Comparative example 5 | D1/C2 | 25/75 | 0.05 | 3.0 | $2 \times 10^{10}$ | $5 \times 10^{12}$ | $4 \times 10^{13}$ | X |

Example 13

PET pellets (intrinsic viscosity 0.63 dl/g) containing 0.008 percent by weight of aggregated silica having an average particle diameter of 0.7 µm and 0.008 percent by weight of aggregated silica having an average particle diameter of 1.4 µm were adequately vacuum-dried and, thereafter, were supplied to an extruder. The pellets were melted at 285° C., and were extruded from a T-die into the shape of a sheet. The resulting sheet was wound around a mirror-finished casting drum having a surface temperature of 20° C. by the use of an electrostatic casting method, followed by cooling and solidifying. The resulting non-stretched film was heated to 88° C., and was stretched by 3.3 times in a longitudinal direction, so that a monoaxially stretched film was prepared. This film was subjected to a corona discharge treatment in air, and the treated surface was coated with a laminated layer-forming coating solution described below.

"Laminated Layer-Forming Coating Solution"

A laminated layer-forming coating solution was prepared by mixing the following Coating solution A2 and Coating solution B6 at a ratio of Coating solution A2/Coating solution B6=75/25 on a weight of solid basis.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B6:

a water-based coating solution in which a polyethylene glycol diglycidyl ether-based epoxy cross-linking agent ("DENACOL" EX-830 produced by Nagase ChemteX Corporation (molecular weight about 530, weight per epoxy equivalent 268, water solubility 100 percent)) serving as an epoxy-based cross-linking agent was dissolved in water.

The coated monoaxially stretched film was grasped with clips, and was led to a preheating zone. After drying was performed at 90° C., the film was continuously stretched by 4 times in a width direction in a heating zone at 105° C., and furthermore, was subjected to a heat treatment in a heating zone at 225° C., so that a laminated film for a protective film was prepared, wherein crystalline orientation was completed. At this time, the thickness of the base PET film was 50 µm, and the thickness of the laminated layer was 0.06 µm. The content of the water-soluble cross-linking agent (B) in this laminated layer was 25 percent by weight. The results are shown in Table 2. Extremely excellent antistatic property, solvent resistance, and thermal shrinkage were exhibited and, in addition, excellent transparency was also exhibited.

Example 14

A laminated film for a protective film was prepared as in Example 13 except that Coating solution A2 and Coating solution B6 were used in place of the laminated layer-forming coating solution in Example 13, while the mixing ratio of Coating solution A2 to Coating solution B6 was controlled at 60/40 (weight ratio of solid). The content of the water-soluble cross-linking agent (B) in this laminated layer was 40 percent by weight. The results are also shown in Table 2. Extremely excellent transparency, antistatic property, solvent resistance, and thermal shrinkage were exhibited.

Example 15

A laminated film for a protective film was prepared as in Example 13 except that a mixture of Coating solution A2 and Coating solution B6 was used in place of the laminated layer-forming coating solution in Example 13, while the ratio of Coating solution A2 to Coating solution B6 was controlled at 30/70 (weight ratio of solid). The content of the water-soluble cross-linking agent (B) in this laminated layer was 70 percent by weight. The results are also shown in Table 2. Extremely excellent transparency, antistatic property, solvent resistance, and thermal shrinkage were exhibited.

Example 16

A laminated film for a protective film was prepared as in Example 13 except that Coating solution A2 and Coating solution B6 were used as the laminated layer-forming coating solution in Example 13, while the mixing ratio of Coating solution A2 to Coating solution B6 was controlled at 15/85 (weight ratio of solid). The content of the water-soluble cross-linking agent (B) in this laminated layer was 85 percent by weight. The results are also shown in Table 2. Extremely excellent transparency, antistatic property, solvent resistance, and thermal shrinkage were exhibited.

Example 17

PET pellets (intrinsic viscosity 0.65 dl/g) containing substantially no particle were adequately vacuum-dried and, thereafter, were supplied to an extruder. The pellets were melted at 280° C., and were extruded from a T-die into the shape of a sheet. The resulting sheet was wound around a mirror-finished casting drum having a surface temperature of 20° C. by the use of an electrostatic casting method, followed by cooling and solidifying. The resulting non-stretched film was heated to 88° C., and was stretched by 3.3 times in a longitudinal direction, so that a monoaxially stretched film was prepared. This film was subjected to a corona discharge treatment in air, and the treated surface was coated with a laminated layer-forming coating solution described below.

"Laminated Layer-Forming Coating Solution"

A laminated layer-forming coating solution was prepared by mixing the following Coating solution A2 and Coating solution B4 at a ratio of Coating solution A2/Coating solution B4=25/75 on a weight of solid basis.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B4:

a water-based coating solution in which ethylene-polyethylene glycol diglycidyl ether-based epoxy cross-linking agent ("DENACOL" EX-810 produced by Nagase ChemteX Corporation (molecular weight about 230, weight per epoxy equivalent 113, water solubility 100 percent)) serving as an epoxy-based cross-linking agent was dissolved in water.

The coated monoaxially stretched film was grasped with clips, and was led to a preheating zone. After drying was performed at 90° C., the film was continuously stretched by 4 times in a width direction in a heating zone at 105° C., and furthermore, was subjected to a heat treatment in a heating zone at 225° C., so that a laminated film for a protective film was prepared, wherein crystalline orientation was completed. At this time, the thickness of the base PET film was 50 µm, and the thickness of the laminated layer was 0.06 µm. The content of the water-soluble cross-linking agent (B) in this laminated layer was 75 percent by weight. The results are shown in Table 2. Extremely excellent transparency, antistatic property, solvent resistance, and thermal shrinkage were exhibited.

Example 18

A laminated film for a protective film was prepared as in Example 13 except that a mixture of Coating solution A2 and Coating solution B5 were used in place of the laminated layer-forming coating solution in Example 13, while the ratio of Coating solution A2 to Coating solution B5 was controlled at 40/60 (weight ratio of solid), and the thickness of the laminated layer was controlled at 0.03 μm. The content of the water-soluble cross-linking agent (B) in this laminated layer was 60 percent by weight. The results are also shown in Table 2. Extremely excellent solvent resistance and thermal shrinkage were exhibited and, in addition, excellent transparency and antistatic property were exhibited as well.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B5:

a water-based coating solution in which methylol type melamine cross-linking agent ("NIKALAC" MW12LF produced by SANWA CHEMICAL CO., LTD. (molecular weight about 340)) serving as a melamine-based cross-linking agent was dissolved in water.

Comparative Example 6

A laminated film for a protective film was prepared as in Example 13 except that the following laminated layer-forming coating solution was used in place of the laminated layer-forming coating solution in Example 13. The content of the water-soluble cross-linking agent (B) in this laminated layer was 0 percent by weight. The results are also shown in Table 2. Whitening of the coating film occurred so that the transparency was significantly poor, no solvent resistance was exhibited, and an extremely poor antistatic property was exhibited.

"Laminated Layer-Forming Coating Solution"

The following Coating solution A2 was used alone as the laminated layer-forming coating solution.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Comparative Example 7

A laminated film for a protective film was prepared as in Example 13 except that a laminated layer-forming coating solution having the following composition was used in place of the laminated layer-forming coating solution in Example 13. The water solubility of the water-soluble cross-linking agent in this laminated layer was 64 percent and, therefore, the water-soluble cross-linking agent was out of the range of the cross-linking agent (B). The results are also shown in Table 2. Whitening of the coating film occurred so that the transparency was poor, no solvent resistance was exhibited, and an extremely poor antistatic property was exhibited.

"Laminated Layer-Forming Coating Solution"

A laminated layer-forming coating solution was prepared by mixing the following Coating solution A2 and Coating solution B7 at a ratio of Coating solution A2/Coating solution B7=90/10 on a weight of solid basis.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B7:

a water-based coating solution composed of glycerol polyglycidyl ether-based epoxy cross-linking agent ("DENACOL" EX-314 produced by Nagase ChemteX Corporation (molecular weight about 320, weight per epoxy equivalent 144, water solubility 64 percent)) serving as an epoxy-based cross-linking agent.

Comparative Example 8

A laminated film for a protective film was prepared as in Example 13 except that a mixture of Coating solution A2 and Coating solution B6 was used as the laminated layer-forming coating solution in Example 13, while the ratio of Coating solution A2 to Coating solution B6 was controlled at 95/5 (weight ratio of solid). The content of the water-soluble cross-linking agent (B) in this laminated layer was 5 percent by weight. The results are also shown in Table 2. Whitening of the coating film occurred so that the transparency was poor, no solvent resistance was exhibited, and the antistatic property was inadequate.

Comparative Example 9

A laminated film for a protective film was prepared as in Example 13 except that a mixture of Coating solution A2 and Coating solution B6 was used as the laminated layer-forming coating solution in Example 13, while the ratio of Coating solution A2 to Coating solution B6 was controlled at 8/92 (weight ratio of solid). The content of the water-soluble cross-linking agent (B) in this laminated layer was 92 percent by weight. The results are also shown in Table 2. The coating film exhibited good transparency and solvent resistance, but exhibited an extremely poor antistatic property.

Comparative Example 10

A laminated film for a protective film was prepared as in Example 13 except that a laminated layer-forming coating solution having the following composition was used in place of the laminated layer-forming coating solution in Example 13. The water solubility of the water-soluble cross-linking agent in this laminated layer was 48 percent and, therefore, the water-soluble cross-linking agent was out of the range of the cross-linking agent (B). The results are also shown in Table 2. Whitening of the coating film occurred so that the transparency was poor, no solvent resistance was exhibited, and an extremely poor antistatic property was exhibited.

"Laminated Layer-Forming Coating Solution"

A laminated layer-forming coating solution was prepared by mixing the following Coating solution A2 and Coating solution B8 at a ratio of Coating solution A2/Coating solution B8=25/75 on a weight of solid basis. Since, the coating solution included many aggregates and insoluble matters, a film was coated with the coating solution filtrated with a filter.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B8:

a water-based coating solution composed of sorbitol polyglycidyl ether-based epoxy cross-linking agent ("DENACOL" EX-611 produced by Nagase ChemteX Corporation (molecular weight about 630, weight per epoxy equivalent 167, water solubility 48 percent)) serving as an epoxy-based cross-linking agent.

Comparative Example 11

A laminated film for a protective film was prepared as in Example 13 except that a laminated layer-forming coating solution having the following composition was used in place of the laminated layer-forming coating solution in Example 13. The results are also shown in Table 2. In the present comparative example, since the composition (A) composed of a polythiophene and/or a derivative thereof and a polyanion was not used, significant humidity dependence was exhibited, and in particular, the antistatic property was extremely poor at a low humidity. Furthermore, whitening of the coating film occurred so that the transparency was poor, and no solvent resistance was exhibited.

"Laminated Layer-Forming Coating Solution"

A laminated layer-forming coating solution was prepared by mixing the following Coating solution D2 and Coating solution B6 at a ratio of Coating solution D2/Coating solution B6=50/50 on a weight of solid basis.

Coating Solution D2:

a water-based coating solution in which sodium polystyrenesulfonate (weight average molecular weight: 500,000) was dissolved in water.

Coating Solution B6:

a water-based coating solution in which a polyethylene glycol diglycidyl ether-based epoxy cross-linking agent ("DENACOL" EX-830 produced by Nagase ChemteX Corporation (molecular weight about 530, weight per epoxy equivalent 268, water solubility 100 percent)) serving as an epoxy-based cross-linking agent was dissolved in water.

Comparative Example 12

A laminated film for a protective film was prepared as in Example 13 except that a laminated layer-forming coating solution having the following composition was used in place of the laminated layer-forming coating solution in Example 13. The content of the water-soluble cross-linking agent (B) in this laminated layer was 0 percent by weight. The results are also shown in Table 2. Whitening of the coating film occurred so that the transparency was poor, no solvent resistance was exhibited, and the antistatic property was inadequate.

"Laminated Layer-Forming Coating Solution"

A laminated layer-forming coating solution was prepared by mixing the following Coating solution A2 and Coating solution C2 at a ratio of Coating solution A2/Coating solution C2=80/20 on a weight of solid basis.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution C2:

a water-based dispersion (so-called "latex"-like coating solution, water solubility: 1 percent or less) in which a granular acrylic resin (glass transition temperature: 42° C.) composed of the following copolymer composition was dispersed in water.

| Copolymer components | |
|---|---|
| methyl methacrylate | 62 mole percent |
| ethyl acrylate | 35 mole percent |
| acrylic acid | 1 mole percent |
| N-methylolacrylamide | 2 mole percent |

Example 19

An acrylic adhesive containing butyl acrylate, 2-ethylhexyl acrylate, and ethylene-acrylic acid was applied by a gravure coating method to the surface opposite to the surface provided with the laminated layer of the laminated film for a protective film prepared in Example 15 in order that an adhesive layer having a thickness after drying and solidification of 10 μm was formed and, thereby, a protective film was prepared.

The protective film was affixed to a polarizer serving as a display component. As a result, very excellent transparency was exhibited, an excellent antistatic property was exhibited on the surface side and, therefore, for example, no dirt was adhered. The adhesive partially adhered to end portions and the like due to lying off of the adhesive applied in the step of processing the adhesive layer was able to be readily wiped off with a gauze impregnated with ethanol, and no change was observed in outward appearance.

TABLE 2

| | Laminated layer composition Coating solution | Content of water-soluble cross-linking agent (B) (percent by weight) | Laminated layer thickness (μm) | Haze (%) | Antistatic property Relative humidity 65% | Relative humidity 25% | Solvent resistance 1 | 2 | 3 | Thermal shrinkage (%) |
|---|---|---|---|---|---|---|---|---|---|---|
| Example 13 | A2/B6 | 25 | 0.06 | 2.5 | $6 \times 10^6$ | $6 \times 10^6$ | 4 | 4 | 4 | 0.7 |
| Example 14 | A2/B6 | 40 | 0.06 | 1.8 | $8 \times 10^6$ | $8 \times 10^6$ | 4 | 4 | 5 | 0.5 |
| Example 15 | A2/B6 | 70 | 0.06 | 1.7 | $4 \times 10^7$ | $4 \times 10^7$ | 5 | 5 | 5 | 0.3 |
| Example 16 | A2/B6 | 85 | 0.06 | 1.2 | $1 \times 10^8$ | $1 \times 10^8$ | 5 | 5 | 5 | 0.3 |
| Example 17 | A2/B4 | 75 | 0.06 | 0.6 | $1 \times 10^7$ | $1 \times 10^7$ | 5 | 5 | 5 | 0.3 |
| Example 18 | A2/B5 | 60 | 0.03 | 3.8 | $6 \times 10^9$ | $6 \times 10^9$ | 4 | 4 | 4 | 0.8 |
| Comparative example 6 | A2 | 0 | 0.06 | 13.2 | $6 \times 10^{14}$ | $8 \times 10^{14}$ | 1 | 1 | 2 | 1.1 |

TABLE 2-continued

| | Laminated layer composition | Content of water-soluble cross-linking agent (B) (percent by | Laminated layer thickness | Haze | Antistatic property | | Solvent resistance | | | Thermal shrinkage |
|---|---|---|---|---|---|---|---|---|---|---|
| | | | | | Relative humidity | Relative humidity | | | | |
| | Coating solution | weight) | (µm) | (%) | 65% | 25% | 1 | 2 | 3 | (%) |
| Comparative example 7 | A2/B7 | 10 | 0.06 | 8.2 | $2 \times 10^{13}$ | $2 \times 10^{13}$ | 2 | 2 | 2 | 1.0 |
| Comparative example 8 | A2/B6 | 5 | 0.06 | 8.7 | $5 \times 10^{12}$ | $5 \times 10^{12}$ | 1 | 1 | 2 | 1.1 |
| Comparative example 9 | A2/B6 | 92 | 0.06 | 1.0 | $1 \times 10^{15}$ | $2 \times 10^{15}$ | 4 | 4 | 5 | 1.1 |
| Comparative example 10 | A2/B8 | 75 | 0.06 | 10.5 | $7 \times 10^{13}$ | $7 \times 10^{13}$ | 2 | 3 | 3 | 1.1 |
| Comparative example 11 | D2/B6 | 50 | 0.1 | 19.0 | $8 \times 10^{12}$ | $5 \times 10^{14}$ | 1 | 1 | 1 | 1.4 |
| Comparative example 12 | A2/C2 | 0 | 0.06 | 13.0 | $6 \times 10^{12}$ | $8 \times 10^{12}$ | 2 | 1 | 2 | 1.4 |

Example 20

PET pellets (intrinsic viscosity 0.63 dl/g) containing 0.01 percent by weight of aggregated silica having an average particle diameter of 0.7 µm and 0.006 percent by weight of aggregated silica having an average particle diameter of 1.4 µm were adequately vacuum-dried and, thereafter, were supplied to an extruder. The pellets were melted at 285° C., and were extruded from a T-die into the shape of a sheet. The resulting sheet was wound around a mirror-finished casting drum having a surface temperature of 25° C. by the use of an electrostatic casting method, followed by cooling and solidifying. The resulting non-stretched film was heated to 89° C., and was stretched by 3.3 times in a longitudinal direction, so that a monoaxially stretched film was prepared. This film was subjected to a corona discharge treatment in air, and the treated surface was coated with a laminated layer-forming coating solution described below.

"Laminated Layer-Forming Coating Solution"

A laminated layer-forming coating solution was prepared by mixing the following Coating solution A2 and Coating solution B6 at a ratio of Coating solution A2/Coating solution B6=25/75 on a weight of solid basis.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B6:

a water-based coating solution in which a polyethylene glycol diglycidyl ether-based epoxy cross-linking agent ("DENACOL" EX-830 produced by Nagase ChemteX Corporation (molecular weight about 530, weight per epoxy equivalent 268, water solubility 100 percent)) serving as an epoxy-based cross-linking agent was dissolved in water.

The coated monoaxially stretched film was grasped with clips, and was led to a preheating zone. After drying was performed at 90° C., the film was continuously stretched by 4.1 times in a width direction in a heating zone at 105° C., and furthermore, was subjected to a heat treatment in a heating zone at 225° C., so that a laminated film serving for a cover tape was prepared, wherein crystalline orientation was completed. At this time, the thickness of the base PET film was 35 µm, and the thickness of the laminated layer was 0.05 µm. The content of the water-soluble cross-linking agent (B) in this laminated layer was 75 percent by weight. The results are shown in Table 3. Extremely excellent transparency, antistatic property, and scratch resistance were exhibited.

Example 21

A laminated film for a cover tape was prepared as in Example 20 except that a mixture of Coating solution A2 and Coating solution B6 was used as the laminated layer-forming coating solution in Example 20 while the ratio of Coating solution A2 to Coating solution B6 was controlled at 75/25 (weight ratio of solid), and the thickness of the laminated layer was controlled at 0.03 µm. The content of the water-soluble cross-linking agent (B) in this laminated layer was 25 percent by weight. The results are also shown in Table 3. Extremely excellent transparency, antistatic property, and scratch resistance were exhibited.

Example 22

A laminated film for a cover tape was prepared as in Example 20 except that a mixture of Coating solution A2 and Coating solution B6 was used as the laminated layer-forming coating solution in Example 20 while the ratio of Coating solution A2 to Coating solution B6 was controlled at 50/50 (weight ratio of solid). The content of the water-soluble cross-linking agent (B) in this laminated layer was 50 percent by weight. The results are also shown in Table 3. Extremely excellent transparency, antistatic property, and scratch resistance were exhibited.

Example 23

A laminated film for a cover tape was prepared as in Example 20 except that a mixture of the following Coating solution A2 and Coating solution B1 was used in place of the laminated layer-forming coating solution in Example 20, while the ratio of Coating solution A2 to Coating solution B1 was controlled at 25/75 (weight ratio of solid). The content of the water-soluble cross-linking agent (B) in this laminated layer was 75 percent by weight. The results are also shown in Table 3. Extremely excellent transparency, antistatic property, and scratch resistance were exhibited.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B1:

a water-based coating solution in which polyglycerol polyglycidyl ether-based epoxy cross-linking agent ("DENACOL" EX-512 produced by Nagase ChemteX Corporation (molecular weight about 630, weight per epoxy equivalent 168, water solubility 100 percent)) serving as an epoxy-based cross-linking agent was dissolved in water.

Example 24

A laminated film for a cover tape was prepared as in Example 20 except that a mixture of the following Coating solution A2 and Coating solution B4 was used in place of the laminated layer-forming coating solution in Example 20, while the ratio of Coating solution A2 to Coating solution B4 was controlled at 30/70 (weight ratio of solid). The content of the water-soluble cross-linking agent (B) in this laminated layer was 70 percent by weight. The results are also shown in Table 3. Extremely excellent transparency, antistatic property, and scratch resistance were exhibited.

"Laminated Layer-Forming Coating Solution"

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B4:

a water-based coating solution in which ethylene·polyethylene glycol diglycidyl ether-based epoxy cross-linking agent ("DENACOL" EX-810 produced by Nagase ChemteX Corporation (molecular weight about 230, weight per epoxy equivalent 113, water solubility 100 percent)) serving as an epoxy-based cross-linking agent was dissolved in water.

Comparative Example 13

A PET film for a cover tape was prepared in Example 20 except that the laminated layer-forming coating solution was not applied and, thereby, no laminated layer was provided. The results are also shown in Table 3. An extremely poor antistatic property was exhibited.

Comparative Example 14

A laminated film for a cover tape was prepared as in Example 20 except that the following laminated layer-forming coating solution was used in place of the laminated layer-forming coating solution in Example 20. The content of the water-soluble cross-linking agent (B) in this laminated layer was 0 percent by weight. The results are also shown in Table 3. The coating film tended to be whitened and scratched, and an extremely poor antistatic property was exhibited.

"Laminated Layer-Forming Coating Solution"

The following Coating solution A2 was used alone as the laminated layer-forming coating solution.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Comparative Example 15

A laminated film for a cover tape was prepared as in Example 20 except that the following laminated layer-forming coating solution was used in place of the laminated layer-forming coating solution in Example 20. The water solubility of the water-soluble cross-linking agent (B) in this laminated layer was 78 percent and, therefore, the water-soluble cross-linking agent was out of the range of the cross-linking agent (B). The results are also shown in Table 3. The coating film tended to be whitened and scratched, and an extremely poor antistatic property was exhibited.

"Laminated Layer-Forming Coating Solution"

A laminated layer-forming coating solution was prepared by mixing the following Coating solution A2 and Coating solution B9 at a ratio of Coating solution A2/Coating solution B9=30/70 on a weight of solid basis.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B9:

a water-based coating solution in which sorbitol polyglycidyl ether-based epoxy cross-linking agent ("DENACOL" EX-614 produced by Nagase ChemteX Corporation (molecular weight about 550, weight per epoxy equivalent 167, water solubility 78 percent)) serving as an epoxy-based cross-linking agent was dissolved in water.

Comparative Example 16

A laminated film for a cover tape was prepared as in Example 20 except that the following laminated layer-forming coating solution was used in place of the laminated layer-forming coating solution in Example 20. The content of the water-soluble cross-linking agent (B) in this laminated layer was 92 percent by weight. The results are also shown in Table 3. An extremely poor antistatic property was exhibited.

"Laminated Layer-Forming Coating Solution"

A laminated layer-forming coating solution was prepared by mixing the following Coating solution A2 and Coating solution B4 at a ratio of Coating solution A2/Coating solution B4=8/92 on a weight of solid basis.

Coating Solution A2:

a water-based coating solution ("DENATRON" #5002RZ produced by Nagase ChemteX Corporation) in which a polyester resin and a complex composed of polyethylenedioxythiophene/polystyrenesulfonic acid were dispersed in water.

Coating Solution B4:

a water-based coating solution in which ethylene-polyethylene glycol diglycidyl ether-based epoxy cross-linking agent ("DENACOL" EX-810 produced by Nagase ChemteX Corporation (molecular weight about 230, weight per epoxy equivalent 113, water solubility 100 percent)) serving as an epoxy-based cross-linking agent was dissolved in water.

Comparative Example 17

A laminated film for a cover tape was prepared as in Example 20 except that the following laminated layer-forming coating solution was used in place of the laminated layer-forming coating solution in Example 20. The content of the water-soluble cross-linking agent (B) in this laminated layer was 0 percent by weight. The results are also shown in Table 3. In the present comparative example, since the composition (A) composed of a polythiophene and/or a derivative thereof and a polyanion and the water-soluble cross-linking agent (B) were not used, significant humidity dependence was exhibited, and in particular, a poor antistatic property was exhibited at a low humidity, and no water resistance was exhibited.

"Laminated Layer-Forming Coating Solution"

A laminated layer-forming coating solution was prepared by mixing the following Coating solution D3 and Coating solution C2 at a ratio of Coating solution D3/Coating solution C2=20/80 on a weight of solid basis.

Coating Solution D3: a water-based coating solution in which ammonium polystyrenesulfonate (weight average molecular weight: 10,000) was dissolved in water.

Coating Solution C2: a water-based dispersion (so-called "latex"-like coating solution, water solubility: 1 percent or less) in which a granular acrylic resin (glass transition temperature: 42° C.) composed of the following copolymer composition was dispersed in water.

| Copolymer components | |
|---|---|
| methyl methacrylate | 62 mole percent |
| ethyl acrylate | 35 mole percent |
| acrylic acid | 1 mole percent |
| N-methylolacrylamide | 2 mole percent |

Example 25

An acrylic adhesive containing butyl acrylate, 2-ethylhexyl acrylate, and ethylene-acrylic acid was applied by a gravure coating method to the surface opposite to the surface provided with the laminated layer of the laminated film for a cover tape prepared in Example 24 in order that an adhesive layer having a thickness after drying and solidification of 5 μm was formed and, thereby, a cover tape was prepared.

The static voltage was measured with an honestmeter. The static voltage was on the order of 20 V when the voltage was applied, and the static voltage attenuated to 0 V after a lapse of 1 second from termination of the application. A cover tape having extremely excellent antistatic property was able to be prepared.

Example 26

The surface opposite to the surface provided with the laminated layer of the laminated film for a cover tape prepared in Example 24 was subjected to a corona discharge treatment in air at a treatment intensity of 30 W·min/m2, a polyethylene film of 16 μm in thickness was heat-laminated on the treated surface and, thereby, a cover tape was prepared.

The static voltage was measured with an honestmeter. The static voltage was on the order of 20 V when the voltage was applied, and the static voltage attenuated to 0 V after a lapse of 1 second from termination of the application. A cover tape having extremely excellent antistatic property was able to be prepared.

Comparative Example 18

An adhesive layer-forming coating solution composed of the following composition was applied by a gravure coating method to the surface opposite to the surface provided with the laminated layer of the laminated film for a cover tape prepared in Example 24 in order that an adhesive layer having a thickness after drying and solidification of 5 μm was formed and, thereby, a cover tape was prepared. After heat lamination of the caver tape and a carrier tape was performed, the peeling was not stable because, for example, peeling occurred spontaneously. The contact angle of water on the surface after being peeled off was measured, and was 62 degrees.

"Adhesive Layer-Forming Coating Solution"

An adhesive layer-forming coating solution was prepared by mixing the following Coating solution E1 and Coating solution F1 at a ratio of Coating solution E1/Coating solution F1=90/10 on a weight of solid basis.

Coating Solution E1: a water-based coating solution in which polyethylene resin emulsion having an emulsion particle diameter of about 0.5 μm was dispersed in water Coating solution F1: a water-based coating solution in which N,N-bis(2-hydroxyethyl)laurylamine serving as a nonionic antistatic agent was dispersed in water Example 27

A plastic sheet in which 15 percent by weight of carbon black was incorporated into a polystyrene resin film and which had a thickness of 3 mm and a width of 25 mm was provided with square recessed-portions having a size of 16 mm×16 mm and a depth of 1.5 mm at spacings of 2 cm with a molding machine and, thereby, a carrier tape was prepared. IC chips were encapsulated into the resulting carrier tape, the surface, on which the polyester film was laminated, of the cover tape prepared in Example 25 and the carrier tape were heat-laminated and, thereby, a carrier package was prepared.

The resulting carrier package had excellent visibility of the portion encapsulating electronic components from the cover tape side, and the static voltage measured with an honestmeter was 0 V after the cover tape was peeled off. The contact angle of water on the surface after the cover tape was peeled off was 100 degrees, and an excellent peeling stability was exhibited.

TABLE 3

| | Laminated layer composition Coating solution | Content of water-soluble cross-linking agent (B) (percent by weight) | Laminated layer thickness (μm) | Haze (%) | Antistatic property Relative humidity 65% | Relative humidity 25% | Scratch resistance 2 |
|---|---|---|---|---|---|---|---|
| Example 20 | A2/B6 | 75 | 0.05 | 1.0 | $7 \times 10^7$ | $7 \times 10^7$ | 5 |
| Example 21 | A2/B6 | 25 | 0.03 | 2.4 | $6 \times 10^6$ | $7 \times 10^6$ | 5 |
| Example 22 | A2/B6 | 50 | 0.05 | 1.8 | $1 \times 10^7$ | $1 \times 10^7$ | 5 |
| Example 23 | A2/B1 | 75 | 0.05 | 1.7 | $2 \times 10^8$ | $2 \times 10^8$ | 5 |
| Example 24 | A2/B4 | 70 | 0.05 | 1.0 | $1 \times 10^7$ | $1 \times 10^7$ | 5 |
| Comparative example 13 | No laminated layer | | | 1.0 | $8 \times 10^{14}$ | $1 \times 10^{15}$ | 5 |
| Comparative example 14 | A2 | 0 | 0.05 | 13.0 | $6 \times 10^{14}$ | $8 \times 10^{14}$ | 2 |
| Comparative example 15 | A2/B9 | 0 | 0.05 | 10.3 | $8 \times 10^{13}$ | $9 \times 10^{13}$ | 3 |
| Comparative example 16 | A2/B4 | 92 | 0.05 | 1.0 | $1 \times 10^{15}$ | $3 \times 10^{15}$ | 5 |
| Comparative example 17 | D3/C2 | 0 | 0.08 | 1.2 | $5 \times 10^{10}$ | $1 \times 10^{13}$ | 2 |

INDUSTRIAL APPLICABILITY

The laminated film has an extremely excellent antistatic property and, therefore, is very useful as a base film for various purposes. The laminated film can be widely used as various base films serving for, e.g., magnetic recording materials, electrically insulating materials, insulating tapes, electrical materials, optics, graphics, cards, transfer foils, ribbons, evaporation, packaging, capacitors, and various tapes.

Furthermore, the laminated film for protective film and the protective film can be primarily used for protecting surfaces during processing and mounting of polarizers and the like used for e.g., liquid crystal televisions, displays for car navigation, liquid crystal displays of cellular phones, and computer displays.

The laminated film for cover tape can be used for cover tapes and carrier packages.

The invention claimed is:

1. A laminated film in which a laminated layer comprising composition (A) and epoxy-based cross-linking agent (B) is laminated on at least one surface of a thermoplastic resin film, wherein the 1) laminated layer comprises at least 70 percent by weight of both composition (A) and epoxy-based cross-linking agent (B) based on the total weight of the laminated layer, 2) epoxy-based cross-linking agent (B) is 40 to 85 percent based on the total weight of the laminated layer and provides a haze value of 1.8% or less, 3) composition (A) is a composition comprising a polythiophene and a polyanion or a composition comprising a polythiophene derivative and a polyanion, 4) epoxy-based cross-linking agent (B) has a molecular weight of 800 or less, 5) laminated layer has a sea-island structure in which the epoxy-based cross-linking agent (B) is present in the composition (A), 6) epoxy-based cross-linking agent (B) is a water-soluble cross-linking agent and 7) laminated layer has a surface resistivity ($23°$ C. relative humidity 65 percent) of $3 \times 10^8$ $\Omega/\square$ or less.

2. The laminated film according to claim 1, wherein the composition (A) includes a composition comprising a polythiophene and a polyanion and a composition comprising a polythiophene derivative and a polyanion.

3. The laminated film according to claim 1, wherein a polyester resin is contained in the laminated layer.

4. The laminated film according to claim 1, wherein the composition (A) is a composition comprising polyethylenedioxythiophene and polystyrenesulfonic acid.

5. The laminated film according to claim 1, wherein the thermoplastic resin film comprises a polyethylene terephthalate film or a polyethylene-2,6-naphthalate film.

6. A protective film in which an adhesive layer is provided on at least one surface of the laminated film according to claim 1.

7. A cover tape in which a polyolefin-based resin layer and/or an adhesive layer of 0.5 to 20 μm in thickness is provided on at least one surface of the laminated film according to claim 1.

8. A carrier package in which a carrier tape is laminated on at least one surface of the laminated film according to claim 1.

9. The laminated film according to claim 1, wherein the surface resistivity ($23°$ C., relative humidity 25%) is $4 \times 10^8$ $\Omega/\square$ or less.

10. The laminated film according to claim 1, wherein a thickness of the laminated layer is 70 nm or less.

11. A method for manufacturing a laminated film, comprising applying a coating solution containing a composition (A) and a cross-linking agent (B) to at least one surface of a thermoplastic resin film directly to form a laminated layer, followed by drying, stretching and heat-treating, wherein the 1) laminated layer comprises at least 70 percent by weight of both composition (A) and epoxy-based cross-linking agent (B) based on the total weight of the laminated layer, 2) epoxy-based cross-linking agent (B) is 40 to 85 percent based on the total weight of the laminated layer and provides a haze value of 1.8% or less, 3) composition (A) is a composition comprising a polythiophene and a polyanion or a composition comprising a polythiophene derivative and a polyanion, 4) epoxy-based cross-linking agent (B) has a molecular weight of 800 or less, 5) laminated layer has a sea-island structure in which the epoxy-based cross-linking agent (B) is present in the composition (A), 6) epoxy-based cross-linking agent (B) is a water soluble cross-linking agent and 7) laminated layer has a surface resistivity ($23°$ C., relative humidity 65 percent) of $3 \times 10^8$ $\Omega/\square$ or less.

12. The laminated film according to claim 11, wherein the surface resistivity ($23°$ C., relative humidity 25%) is $4 \times 10^8$ $\Omega/\square$ or less.

13. The method for manufacturing a laminated film according to claim 11, wherein a thickness of the laminated layer is 70 nm or less.

14. A laminated film for a protective film, in which a laminated layer comprising (A) and epoxy-based cross-linking agent (B) is laminated on at least one surface of a thermoplastic resin film wherein the 1) laminated layer comprises at least 70 percent by weight of both composition (A) and epoxy-based cross-linking agent (B) based on the total weight of the laminated layer, 2) epoxy-based cross-linking agent (B) is 40 to 85 percent based on the total weight of the laminated layer and provides a haze value of 1.8% or less, 3) composition (A) is a composition comprising a polythiophene and a polyanion or a composition comprising a polythiophene derivative and polyanion, 4) epoxy-based cross-linking agent (B) has a molecular weight of 800 or less, 5) laminated layer has a sea-island structure in which the epoxy-based cross-linking agent (B) is presented in the composition (A), 6) epoxy-based cross-linking agent (B) is a water-soluble cross-linking agent and 7) laminated layer has a surface resistivity ($23°$ C., relative humidity 65 percent) of $3 \times 10^8$ $\Omega/\square$ or less.

15. The laminated film according to claim 14, wherein the thermal shrinkage is −0.5 percent or more and 1 percent or less after a lapse of 30 minutes at $150°$ C.

16. A protective film in which an adhesive layer is provided on at least one surface of the laminated film according to claim 14.

17. The laminated film according to claim 14, wherein the surface resistivity ($23°$ C., relative humidity 25%) is $4 \times 10^8$ $\Omega/\square$ or less.

18. The laminated film for a protective film according to claim 14, wherein a thickness of the laminated layer is 70 nm or less.

19. A laminated film for a cover tape, in which a laminated layer comprising composition (A) and epoxy-based cross-linking agent (B) is laminated on at least one surface of a thermoplastic resin film, wherein the 1) laminated layer comprises at least 70 percent by weight of both composition (A) and epoxy-based cross-linking agent (B) based on the total weight of the laminated layer, 2) epoxy-based cross-linking agent (B) is 40 to 85 percent based on the total weight of the laminated layer and provides a haze value of 1.8% or less, 3) composition (A) is a composition comprising a polythiophene and a polyanion or a composition comprising a polythiophene derivative and a polyanion, 4) epoxy-based cross-linking agent (B) has a molecular weight of 800 or less, 5) laminated layer has a sea-island structure in which the epoxy-based cross-linking agent (B) is present in the composition (A), 6)

epoxy-based cross-linking agent (B) is a water-soluble cross-linking agent and 7) laminated layer has a surface resistivity (23° C., relative humidity 65 percent) of $3\times10^8$ Ω/□ or less.

20. A cover tape in which a polyolefin-based resin layer and/or an adhesive layer of 0.5 to 20 μm in thickness is provided on at least one surface of the laminated film serving for a cover tape according to claim 19.

21. The cover tape according to claim 20, wherein the polyolefin-based resin is a polyethylene resin, and the contact angle of water on the surface of the polyolefin-based resin layer and/or an adhesive layer is 80 to 110 degrees.

22. A cater package in which a polyolefin-based resin layer and/or an adhesive layer of 0.5 to 20 μm in thickness is provided on at least one surface of the laminated film serving for a cover tape according to claim 19, and a carrier tape is laminated on the polyolefin-based resin layer and/or an adhesive layer.

23. The laminated film according to claim 19, wherein the resistivity (23° C., relative humidity 25%) is $4\times10^8$ Ω/□ or less.

24. The laminated film for a cover tape according to claim 19, wherein a thickness of the laminated layer is 70 nm or less.

25. A laminated film for a transfer foil, in which a laminated layer comprising composition (A) and epoxy-based cross-linking agent (B) is laminated on at least one surface of a thermoplastic resin film wherein the 1) laminated layer comprises at least 70 percent by weight of both composition (A) and epoxy-based cross-linking agent (B) based on the total weight of the laminated layer, 2) epoxy-based cross-linking agent (B) is 40 to 85 percent based on the total weight of the laminated layer by weight in the laminated layer and provides a haze value of 1.8% or less, 3) composition (A) is a composition comprising a polythiophene and a polyanion or a composition comprising a polythiophene derivate and a polyanion 4) epoxy-based cross-linking agent (B) has a molecular weight of 800 or less, 5) laminated layer has a sea-island structure in which the epoxy-based cross-linking agent (B) is presented in the composition (A), 6) epoxy-based cross-linking agent (B) is a water-soluble cross-linking agent and 7) laminated layer has a surface resistivity (23° C., relative humidity 65 percent of $3\times10^8$ Ω/□ or less.

26. The laminated film according to claim 25, wherein the surface resistivity (23° C., relative humidity 25%) is $4\times10^8$ Ω/□ or less.

27. The laminated film for a transfer foil according to claim 25, wherein a thickness of the laminated layer is 70 nm or less.

* * * * *

UNITED STATES PATENT AND TRADEMARK OFFICE
CERTIFICATE OF CORRECTION

PATENT NO. : 7,678,455 B2  Page 1 of 1
APPLICATION NO. : 10/497555
DATED : March 16, 2010
INVENTOR(S) : Takada et al.

It is certified that error appears in the above-identified patent and that said Letters Patent is hereby corrected as shown below:

In Column 20

At line 11, please change "($OSO_4$)" to --($OsO_4$)--.

Signed and Sealed this

Fourteenth Day of September, 2010

David J. Kappos
*Director of the United States Patent and Trademark Office*